United States Patent
Shah et al.

(10) Patent No.: US 10,447,610 B1
(45) Date of Patent: Oct. 15, 2019

(54) TECHNIQUES FOR NETWORK REDIRECTION

(71) Applicant: Amazon Technologies, Inc., Reno, NV (US)

(72) Inventors: Shon Kiran Shah, Redmond, WA (US); Guruprakash Bangalore Rao, Bellevue, WA (US); Thomas Christopher Rizzo, Sammamish, WA (US); Connor John Yorks, Seattle, WA (US); Kevin Gillett, Menlo Park, CA (US); Gaurang Pankaj Mehta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 14/098,446

(22) Filed: Dec. 5, 2013

Related U.S. Application Data

(60) Provisional application No. 61/902,790, filed on Nov. 11, 2013.

(51) Int. Cl.
*H04L 29/12* (2006.01)
*H04L 12/911* (2013.01)
(Continued)

(52) U.S. Cl.
CPC .......... *H04L 47/70* (2013.01); *G06F 16/955* (2019.01); *G06F 16/9566* (2019.01);
(Continued)

(58) Field of Classification Search
CPC ..... H04L 67/16; H04L 67/02; H04L 67/1097; H04L 61/1511; H04L 61/1552;
(Continued)

(56) References Cited

U.S. PATENT DOCUMENTS 6,055,637 A 4/2000 Hudson et al.
6,209,036 B1 3/2001 Aldred et al.
(Continued)

FOREIGN PATENT DOCUMENTS

FR 2964813 3/2012
JP 2004355439 12/2004
(Continued)

OTHER PUBLICATIONS

International Search Report and Written Opinion dated Feb. 4, 2015, International Patent Application No. PCT/US2014/064894, filed Nov. 10, 2014, 14 pages.
(Continued)

*Primary Examiner* — Jungwon Chang
(74) *Attorney, Agent, or Firm* — Davis Wright Tremaine LLP

(57) ABSTRACT

Techniques for connecting computer system entities to remotely located computer system resources by redirecting locators are described herein. A computer system entity that requests access to a computer system resource may first obtain an identifier for that resource and, based on the identifier, may determine the region for that resource. A routing service then resolves the locator to locate a content management system that stores executable scripts that provide access to the computer system resources by redirecting the locator. The location of the executable scripts is based at least in part on the processing of the locator by the content management system.

23 Claims, 13 Drawing Sheets

(51) Int. Cl.
- *G06F 16/955* (2019.01)
- *G06F 17/22* (2006.01)
- *H04L 29/08* (2006.01)
- *H04L 12/24* (2006.01)

(52) U.S. Cl.
CPC .......... *G06F 17/2235* (2013.01); *H04L 41/50* (2013.01); *H04L 61/10* (2013.01); *H04L 61/20* (2013.01); *H04L 61/303* (2013.01); *H04L 67/02* (2013.01); *H04L 67/10* (2013.01)

(58) Field of Classification Search
CPC ............... H04L 61/609; H04L 41/0226; H04L 41/0273; H04L 67/10; H04L 47/70; H04L 61/303; H04L 61/20; H04L 61/10; H04L 41/50; G06F 17/30241; G06F 17/30876; G06F 21/6218; G06F 17/3089; G06F 9/44; G06F 16/9566; G06F 16/955; G06F 17/2235
USPC ....... 709/217, 219, 223, 245, 246, 203, 225; 370/254
See application file for complete search history.

(56) References Cited

U.S. PATENT DOCUMENTS

| | | |
|---|---|---|
| 6,609,128 B1 | 8/2003 | Underwood |
| 7,574,202 B1 | 8/2009 | Tsao et al. |
| 8,045,486 B2 | 10/2011 | Swan |
| 8,145,798 B1 | 3/2012 | Buck et al. |
| 8,224,994 B1 | 7/2012 | Schneider |
| 8,255,984 B1 | 8/2012 | Ghostine et al. |
| 8,307,003 B1 | 11/2012 | Sheth et al. |
| 8,346,824 B1 | 1/2013 | Lyle et al. |
| 8,533,796 B1 | 9/2013 | Shenoy et al. |
| 8,656,471 B1 | 2/2014 | Allen et al. |
| 8,856,506 B2 | 10/2014 | Weber et al. |
| 9,213,513 B2 | 12/2015 | Hartz et al. |
| 9,639,384 B2 | 5/2017 | Govindnkutty et al. |
| 2002/0143943 A1 | 10/2002 | Lee et al. |
| 2003/0074448 A1* | 4/2003 | Kinebuchi ............... H04L 29/06 709/225 |
| 2003/0229645 A1 | 12/2003 | Mogi et al. |
| 2004/0205152 A1 | 10/2004 | Yasuda et al. |
| 2005/0102513 A1 | 5/2005 | Alve |
| 2005/0203993 A1 | 9/2005 | Grobman et al. |
| 2006/0059252 A1* | 3/2006 | Tatsubori ............ G06F 21/6218 709/223 |
| 2007/0112877 A1 | 5/2007 | Harvey et al. |
| 2007/0143829 A1 | 6/2007 | Hinton et al. |
| 2007/0300220 A1 | 12/2007 | Seliger et al. |
| 2007/0300221 A1 | 12/2007 | Hartz et al. |
| 2008/0016143 A1* | 1/2008 | Bumpus ............. H04L 41/0226 709/203 |
| 2008/0046593 A1* | 2/2008 | Ando ................ G06F 17/30876 709/245 |
| 2008/0140618 A1 | 6/2008 | Kumar |
| 2008/0208853 A1* | 8/2008 | Vismans ................... G06F 9/44 |
| 2008/0320566 A1 | 12/2008 | Herzog et al. |
| 2009/0089625 A1 | 4/2009 | Kannappan et al. |
| 2009/0112875 A1 | 4/2009 | Maes |
| 2009/0157850 A1* | 6/2009 | Gagliardi ............ G06F 17/3089 709/219 |
| 2009/0178132 A1 | 7/2009 | Hudis et al. |
| 2009/0198835 A1 | 8/2009 | Madhusudanan et al. |
| 2009/0249439 A1 | 10/2009 | Olden et al. |
| 2009/0288084 A1 | 11/2009 | Astete et al. |
| 2009/0328178 A1 | 12/2009 | McDaniel et al. |
| 2010/0017889 A1 | 1/2010 | Newstadt et al. |
| 2010/0122248 A1 | 5/2010 | Robinson et al. |
| 2010/0142401 A1* | 6/2010 | Morris ............. G06F 17/30241 370/254 |
| 2010/0254375 A1 | 10/2010 | Feuerhahn et al. |
| 2011/0066668 A1 | 3/2011 | Guarraci |
| 2011/0099147 A1 | 4/2011 | McAlister et al. |
| 2011/0185355 A1 | 7/2011 | Chawla et al. |
| 2011/0191834 A1 | 8/2011 | Singh et al. |
| 2011/0251992 A1 | 10/2011 | Bethlehem et al. |
| 2011/0314520 A1 | 12/2011 | Olszewski et al. |
| 2012/0011578 A1 | 1/2012 | Hinton et al. |
| 2012/0017271 A1 | 1/2012 | Smith et al. |
| 2012/0030673 A1 | 2/2012 | Sakamoto |
| 2012/0066348 A1* | 3/2012 | Alnas ................. H04L 41/0273 709/219 |
| 2012/0110055 A1 | 5/2012 | Van Biljon et al. |
| 2012/0110574 A1 | 5/2012 | Kumar |
| 2012/0179802 A1 | 7/2012 | Narasimhan et al. |
| 2012/0179820 A1 | 7/2012 | Ringdahl et al. |
| 2012/0198022 A1* | 8/2012 | Black ................. H04L 67/1097 709/217 |
| 2012/0233314 A1 | 9/2012 | Jakobsson |
| 2012/0246738 A1 | 9/2012 | Shah et al. |
| 2012/0266168 A1 | 10/2012 | Spivak et al. |
| 2012/0281708 A1 | 11/2012 | Chauhan et al. |
| 2012/0290630 A1 | 11/2012 | Aizman et al. |
| 2013/0007845 A1 | 1/2013 | Chang et al. |
| 2013/0034021 A1 | 2/2013 | Jaiswal et al. |
| 2013/0042115 A1 | 2/2013 | Sweet et al. |
| 2013/0054639 A1 | 2/2013 | Sharma et al. |
| 2013/0066834 A1 | 3/2013 | McAlister et al. |
| 2013/0167145 A1 | 6/2013 | Krishnamurthy et al. |
| 2013/0174216 A1 | 7/2013 | Simske et al. |
| 2013/0191828 A1 | 7/2013 | Wells et al. |
| 2013/0198340 A1* | 8/2013 | Ukkola .................. H04L 67/02 709/219 |
| 2013/0227140 A1 | 8/2013 | Hinton et al. |
| 2013/0230042 A1 | 9/2013 | Shatsky et al. |
| 2013/0238808 A1 | 9/2013 | Hallem et al. |
| 2013/0247036 A1 | 9/2013 | Fujiwara |
| 2013/0254847 A1 | 9/2013 | Adams et al. |
| 2013/0283270 A1 | 10/2013 | Holland et al. |
| 2013/0283298 A1 | 10/2013 | Ali et al. |
| 2014/0040993 A1 | 2/2014 | Lorenzo et al. |
| 2014/0075501 A1 | 3/2014 | Srinivasan et al. |
| 2014/0250075 A1 | 9/2014 | Broido et al. |
| 2014/0282510 A1 | 9/2014 | Anderson et al. |
| 2014/0298398 A1 | 10/2014 | Neely |
| 2014/0325622 A1 | 10/2014 | Luk et al. |
| 2014/0365549 A1 | 12/2014 | Jenkins |
| 2015/0058837 A1 | 2/2015 | Govindankutty et al. |
| 2015/0089061 A1 | 3/2015 | Li et al. |
| 2015/0237149 A1* | 8/2015 | MacInnis ................ H04L 67/16 709/217 |
| 2017/0337071 A1 | 11/2017 | Scott et al. |

FOREIGN PATENT DOCUMENTS

| | | |
|---|---|---|
| JP | 2005004648 | 1/2005 |
| JP | 2005258672 | 9/2005 |
| JP | 2009519530 | 5/2009 |
| JP | 2009176097 | 8/2009 |
| JP | 2010027028 | 2/2010 |
| JP | 2010092475 | 4/2010 |
| JP | 2011186637 | 9/2011 |
| JP | 2012032956 | 2/2012 |
| JP | 2012123459 | 6/2012 |
| JP | 2013084235 | 5/2013 |
| JP | 2013527532 | 6/2013 |
| JP | 2013532854 | 8/2013 |
| JP | 2013540314 | 10/2013 |
| JP | 2015503782 | 2/2015 |
| JP | 2016540295 | 12/2016 |
| WO | WO2011106716 | 9/2011 |
| WO | WO2013146537 | 10/2013 |

OTHER PUBLICATIONS

International Search Report and Written Opinion dated Feb. 19, 2015, International Patent Application No. PCT/US2014/065084, filed Nov. 11, 2014, 15 pages.

(56) References Cited

OTHER PUBLICATIONS

International Search Report and Written Opinion dated Feb. 11, 2015, International Patent Application No. PCT/US2014/065081, filed Nov. 11, 2014, 11 pages.
International Search Report and Written Opinion dated Feb. 23, 2015, International Patent Application No. PCT/US2014/065088, filed Nov. 11, 2014, 13 pages.
Bucicoiu et al., "Secure Cloud Video Streaming Using Tokens," RoEduNet Conference 13th Edition: Networking in Education and Research Joint Event Renam 8th Conference, Jan. 2014, 6 pages.
Carrion et al., "A Generic Catalog and Repository Service for Virtual Machine Images," 2010, University of Valencia, retrieved from internet https://www.researchgate.net/profile/German_Molto/publication/233906883_A_Generic_Catalog_and_Repository_Service_for_Virtual_Machine_Images/links/0fcfd50cbb119a1184000000.pdf, 15 pages.
Lopez et al., "Providing secure mobile access to information servers with temporary certificates," 1999, retrieved from http://ac.els-cdn.com/S138912869900105X/1-s2.0-S138912869900105X-main.pdf?_tid=8d31c448-e679-11e6-b14f-00000aacb35f&acdnat=1485732221_f0f3684af0254bee6476a83214f9cf32, 5 pages.
Anonymous, "vCloud Automation Center Operating Guide for vCloud Automation Center 5.2," VMware, Jul. 17, 2013, retrieved on May 8, 2017, from https://web-beta.archive.org/web/20130717235803/http://www.vmware.com/pdf/vcac-52-operating-guide.pdf, 332 pages.
Japanese Office Action, dated Oct. 11, 2017, for Application No. 2016-528219, 10 pages.
Anonymous, "Microsoft Windows Server 2008R2 Directory Services (DS) on Amazon EC2," Oct. 21, 2012, retrieved on May 10, 2017, from internet at https://web.archive.org/web/20121021194026/https://awsmedia.s3.amazonaws.com/pdf/EC2_AD_How_to.pdf, 8 pages.
Canadian Notice of Allowance for Patent Application No. 2,930,253 dated Dec. 7, 2017, 1 page.
Canadian Office Action for Patent Application No. 2,930,255 dated Apr. 16, 2018, 5 pages.
Canadian Office Action for Patent Application No. 2,930,281 dated Nov. 23, 2017, 6 pages.
Canadian Office Action for Patent Application No. 2,930,292 dated Feb. 9, 2018, 4 pages.
European Communication pursuant to Article 94(3) EPC dated Apr. 17, 2018, for Application No. 14859670.3, 3 pages.
Japanese Final Rejection, dated Dec. 18, 2017, for Patent Application No. 2016-528232, 6 pages.
Japanese Patent Application No. 2016-528217, Decision to Grant a Patent, dated Jan. 15, 2018, filed Nov. 10, 2014, 6 pages.
Chinese Notice of Grant for Patent Application No. 201480068869.8 dated Mar. 14, 2019, 4 pages.
European Search Report dated Feb. 22, 2019, for Patent Application No. EP18204451, 9 pages.
Anonymous, "AWS Identity and Access Management Using IAM," dated Jun. 20, 2013, retrieved on Feb. 12, 2019 from https://web.archive.org/web/20130620090425if_/http://awsdocs.s3.amazonaws.com/IAM/latest/iam-ug.pdf, 219 pages.
Chinese Notice of Grant for Patent Application No. 201480068732.2 dated Mar. 15, 2019, 4 pages.
Canadian Notice of Allowance for Patent Application No. 2,930,255 dated Apr. 2, 2019, 1 page.
Chinese Second Office Action for Patent Application No. 201480072547.0, dated Feb. 11, 2019, 12 pages.
Canadian Notice of Allowance for Patent Application No. 2,930,292 dated Feb. 1, 2019, 1 page.
Canadian Office Action, dated Oct. 22, 2018, for Patent Application No. 2,930,281, 4 pages.
Chinese First Office Action for Patent Application No. 201480068648.0 dated Dec. 12, 2018, 8 pages.
Chinese Second Office Action for Patent Application No. 201480068732.2 dated Nov. 21, 2018, 7 pages.
European Communication under Rule 71(3) EPC for Application No. 14859670.3, Intention to Grant, dated Jan. 3, 2019, 58 pages.
Japanese First Office Action for Patent Application No. 2016-528217 dated Feb. 2, 2019, 5 pages.
Chinese First Office Action for Patent Application No. 201480068732.2 dated Jun. 15, 2018, 12 pages.
Chinese First Office Action for Patent Application No. 201480068869.8 dated Jun. 27, 2018, 12 pages.
Chinese First Office Action for Patent Application No. 201480072547.0 dated Jul. 2, 2018, 16 pages.
European Communication Under Rule 71(3) EPC for Application No. 14860094.3, Intention to Grant, dated Jul. 5, 2018, 57 pages.
European Communication under Rule 71(3) EPC for Application No. 14860654.4, Intention to Grant, dated Jul. 16, 2018, 149 pages.
European Communication under Rule 71(3) EPC for Application No. 14861058.7, Intention to Grant, dated Jun. 29, 2018, 55 pages.
Japanese Decision to Grant dated Jun. 11, 2018 for Patent Application No. 2016-528232, 6 pages.
Japanese Decision to Grant for Patent Application No. 2016-528219 dated Aug. 20, 2018, 6 pages.
Chinese Second Office Action dated Jun. 25, 2019, for Patent Application No. 201480068648.0, 9 pages.
Japanese Notice to Grant, dated Jul. 8, 2019, for Patent Application No. 2018-073523, 6 pages.
Japanese Office Action, dated Jun. 17, 2019, for Patent Application No. 2018-073523, 3 pages.

\* cited by examiner

TECHNIQUES FOR NETWORK REDIRECTION

CROSS REFERENCE TO RELATED APPLICATIONS

This application claims the benefit of U.S. Provisional Application No. 61/902,790, filed on Nov. 11, 2013, entitled "MANAGED DIRECTORY SERVICE," the content of which is incorporated by reference herein in its entirety.

BACKGROUND

Modern computer systems employ a combination of local and remote systems, typically distributing resources, processing, storage and other such computer system capabilities across a variety of computer system entities and sending requests between the system entities. Because of the distributed nature of such systems, resources created in one region may be required in another region, and access to such remote system resources can be problematic, often resulting in long latencies for responses, frequent disconnects and loss of system availability. Because different remote system elements may have different authorization and authentication systems, administrators of such systems may have to manage a plurality of accounts and credentials to allow users access to the resources provided by the distributed system, also leading to maintenance issues, additional costs and potential security issues.

BRIEF DESCRIPTION OF THE DRAWINGS

Various embodiments in accordance with the present disclosure will be described with reference to the drawings, in which.

DETAILED DESCRIPTION

Figure 1:
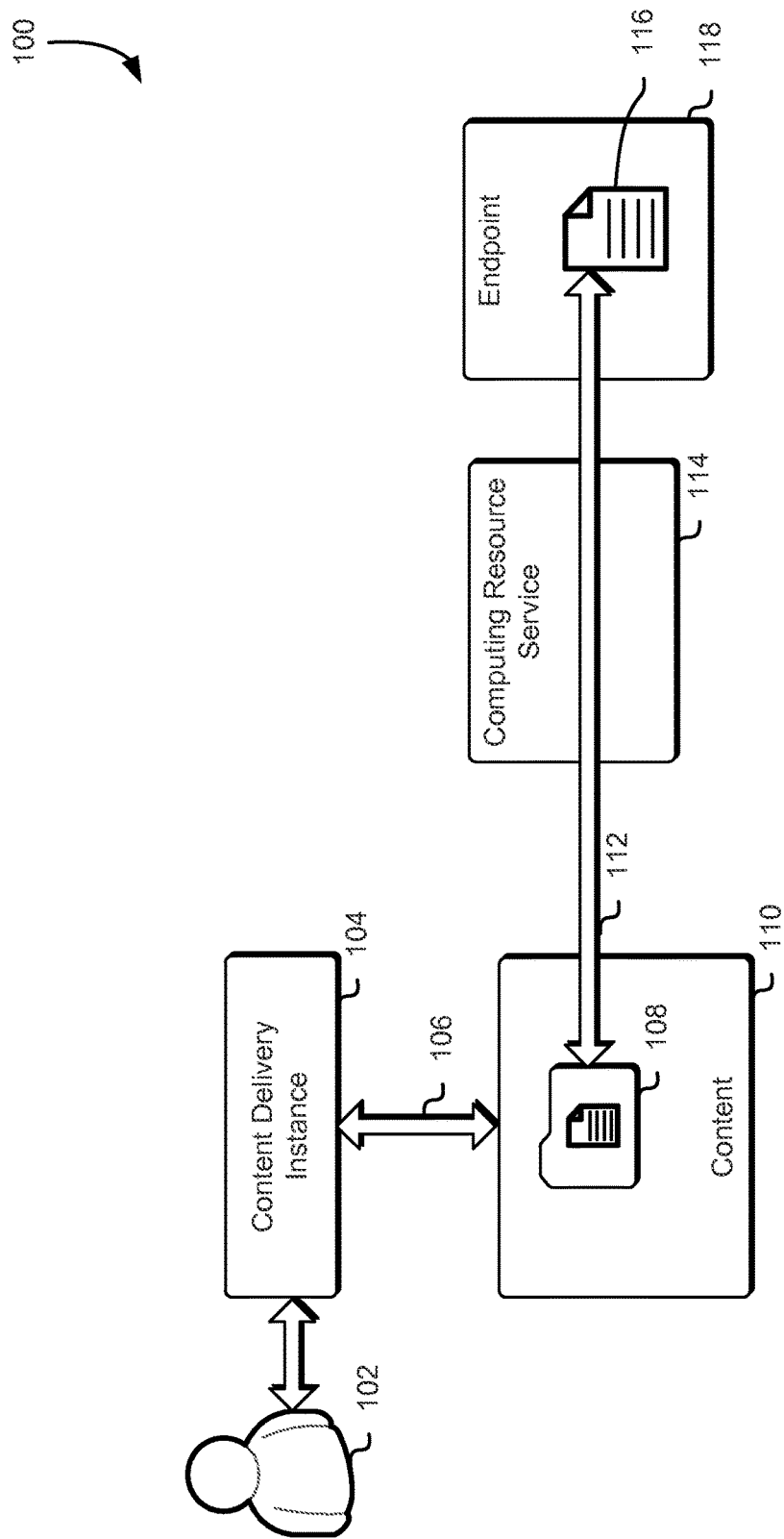
FIG. 1 illustrates an example environment where computer system resources may be accessed in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for managing access to and/or operations on resources on distributed and/or virtualized computer systems and executable code operating thereon. In particular, techniques are disclosed for utilizing system capabilities to facilitate and manage access to system resources such as directory services, web services, directories, file systems, files, users, security policies, network resources, applications, system storage and the like, by and for computer system entities including, but not limited to, users, services, processes, applications, client devices, guest operating systems and/or other such computer system entities. A distributed and/or virtualized computer system may benefit from efficient management of local and/or remote system resources in order to facilitate better system performance, better access to system resources, higher availability of system resources, better data security, better user security and/or other such system benefits.

A distributed and/or virtualized computer system may implement one or more computer system services and may have one or more system resources such as user resources, policy resources, network resources, storage resources and/or other such resources associated with the computer system and, in some embodiments, located in one or more datacenters. The computer system services and the system resources such as user resources, policy resources, network resources, storage resources and/or other such resources associated with the services may be collectively referred to herein in the present disclosure variously as system resources, computer system resources, services and resources.

In some embodiments, access to computer system services and/or resources may be based at least in part on where the services reside and/or where the resources are created. Services and/or resource may be created and may operate in a single region of a multi-region distributed computer system. A distributed computing system may, for example, comprise computing resources (e.g., various computers, network devices, and/or other computing devices) distributed among multiple data centers where the data centers are distributed geographically (e.g., among a set of legal jurisdictions, each corresponding to a different region). In some embodiments, it may be beneficial for a computing resources service provider to create services and/or resources one or more regions in order to facilitate system improvements such as lower latency communications, better resource balancing and/or other such system improvements. In some embodiments, services and/or resources created in one region may not be accessible or available to services and/or resources in a different region. In such embodiments, methods of providing access to resources across regions may be provided by routing and/or redirecting requests from one region to another. In some embodiments, a computing resource service may be configured to provide some of the capabilities for services and/or resources across regions.

A computing resource service is a service, such as a managed directory service, a web service and/or some other such computing resource service that may manage content, access, policies, users and/or other such computer system resources for a computer system resource such as a directory service, a web service and/or some other such computer system resource. The computer system resources that are managed by the computing resource service may be referred to herein as endpoints, system endpoints, computer system endpoints, resources, endpoint resources, computer system resources, system resources and/or other such terms. A computing resource service may provide computing resource operations for a computer system resource in a variety of ways. For example, a resource and/or service such as a directory as a service (DaaS), which may have operational capabilities to manage system users, resources, policies, network access and/or security on a computer system, may have access provided across regions by a computing resource service wherein the computing resource service may be configured to manage access to such capabilities across different regions in distributed and/or virtualized computer systems.

Other services may also be used to manage access to system services and/or resources across regions in distributed and/or virtualized computer systems. For example, a resource and/or service such as a DaaS may be created in, and may operate in, a certain region in a distributed and/or virtualized computer system. The DaaS may have a unique identifier that may be available to computer system entities in that region and may also have a unique locator such as a URI that may be used to locate the DaaS within the region using a service such as a computing resource service. A user, process, service, application or other such computer system entity may require access to the DaaS and may require such access from a different region, where the DaaS is not available or accessible. A computer system may provide such remote access by, in some embodiments, providing a different URI to the computer system user, process, service, application or other such computer system entity and then may redirect the second URI to the DaaS endpoint using computer system services, capabilities, operations and/or other such computer system resources.

A distributed and/or virtualized computer system may provide a URI which may be redirected to computer system entities and may, in some embodiments, provide a single URI to computer system entities regardless of which region such entities may be located. The URI may, in some embodiments, be a uniform resource identifier (URI), a uniform resource locator (URL) or some other such resource identifier and will simply be referred to in the present disclosure as "uniform resource identifier" or "URI." In some embodiments, the provided URI may be based on the endpoint URI of the regional computer system resource. In some embodiments, the provided URI may have little relationship to the endpoint URI of the regional computer system resource and may instead be determined by customer need, system policies, administrator choice, system configuration values such as date, time, machine identifier, customer identifier or combinations of these and/or other such factors.

The provided URI may be transferred to a computer system routing service which may be configured to at least determine the location that the provided URI originates from and to determine what region the endpoint URI is in, and may then be able to route the request to an appropriate content provider service based at least in part on the originating region of the request and the destination endpoint of the computer system resource. In some embodiments, the computer system may implement one content provider service for each region in the distributed and/or virtualized computer system. For example, in a distributed and/or virtualized computer system with four regions, there may be four content provider service instances with each one configured to at least process content requests for a single region.

Each content provider instance may then redirect the provided URI to the appropriate content in the appropriate region based at least in part on the destination endpoint of the computer system resource and/or on the contents of the provided URI. For example, a provided URI may include commands, arguments and/or other such data that indicates that the requesting computer system entity wishes to access a system maintenance console for the computer system resource. The content provider may use the information in the provided URI to locate one or more folders in the regional content that correspond to the destination endpoint of the computer system resource and may use the commands, arguments and/or other such data to locate the one folder that contains instructions, executable code, scripts, applications, data and/or other such redirection information to provide the content for the login console to the requesting computer system entity.

In some embodiments, there may be several commands and/or operations that a computer system resource such as a DaaS may provide to a requesting computer system entity. For example, a computer system resource may expose commands to login, execute a console, reset and manage the computer system resource. Each command may have a single folder in the regional content container that contains the instructions, executable code, scripts, applications, data and/or other such redirection resources for that command, on that computer system resource. If the distributed and/or virtualized computer system has, for example, four regions, then each of the four regional content management system instances may have access to each of the four command folders, resulting in, in this instance, sixteen folders with four for each region.

In some embodiments, the folders may be statically configured at the time that the computer system resource is created. Such folders and the content container that holds them may be regional, so that there may be one content container for each region. In some embodiments, the content management system instances may also be statically configured at the time that the computer system resource and/or the content containers are created. Such content management instances may be non-regional and may be available to any computer system entity in the distributed and/or virtualized computer system. In some embodiments, the routing service may be dynamically configured and may exist prior to the creation of the other entities described herein. As new content management instances are created in response to the creation of content containers and computer system resources, entries in the routing service table may be added to provide access to the content management instances via the provided URI.

In some embodiments, the services described herein that are associated with providing the access to a computer system resource may be created at the time that the resource is created. In some embodiments, the services described herein may be created after the computer system resource is created, if it is determined later that the computer system resource needs to be made more available. For example, in an embodiment where the computer system resource is a DaaS, a user may create a directory service that the user intends to remain private and not be made available to other computer system entities in different regions of a distributed and/or virtualized computer system. At a later date, the user may decide that the computer system resource needs to be available to computer system entities in different regions and may, at that time, add content containers with access resources, content delivery instances and routing service table entries to make the computer service resource available to the different regions. The user may also, at this time, provide the access URI that computer system entities in other regions may use to access the resource using the redirection approach described herein.

FIG. 1 illustrates an environment 100 for accessing content on computer system resources and accessing services and resources associated with such computer system resources such as user resources, policy resources, storage resources and/or other such resources, on distributed and/or virtualized computer system environments as well as the code running thereon in accordance with at least one embodiment. A computer system entity, user or process 102 may connect to a computer system content delivery service 104 which may request access via connection 106 to computer system content 110. In some embodiments, the command or commands to request access to the computer system content delivery service may originate from an outside computer system and/or server, or may originate from an entity, user or process on a remote network location, or may originate from the computer system, or may originate from a user of the computer system client device, or may originate as a result of a combination of these and/or other such objects. The command or commands to request access to the service may, in some embodiments, be issued by a trusted user, or by a user, or by an autonomous process, or as a result of an alarm and/or other such condition or by a combination of these and/or other such methods.

In some embodiments one or more computer system content provider services may be running on a computing resource service provider that may provide access to computer services such as virtual machine (VM) instances, automatic scaling groups, file-based database storage systems, block storage services, redundant data storage services, data archive services, data warehousing services, user access management services, content management services and/or other such computer system services. The computing resource service provider may also provide access to computer system services and resources such as user resources, policy resources, network resources and/or storage resources associated with the computer system services. In some distributed and/or virtualized computer system environments, the resources associated with the computer services may be physical devices, virtual devices, combinations of physical and/or virtual devices or other such device embodiments.

In some embodiments, access to the computer system content provider service and/or other services running on the computer resource service provider may be provided by one or more connections between sets of one or more computer system entities such as connection 106. A computer system entity or resource such as computer system user, process or service may connect to another local and/or remote computer system entity or resource using one or more connection protocols such as network protocols or other such communication protocols over one or more connections such as the network connections described herein. A connection between a computer system entity and a computer system resource may, for example, be a one way connection, a two-way connection, a read-only connection, a read-write connection or a combination of these and/or other connection types. Access to the computer system content provider service and/or other services running on the computing resource service provider may be controlled, regulated and/or maintained by access credentials provided by the computing resource service provider and/or one or more other services running on the computing resource service provider. In some embodiments, connection credentials may include credentials such as user names, passwords, key phrases, biometric devices, hardware keys, virtual hardware keys and other such authentication and/or authorization credentials.

The computer system content 110 may include content 108 that may provide access to local and/or remote resources on the computer system. In some embodiments, the content 108 that may provide access to local and/or remote resources on the computer system may include links or locators such as a uniform resource identifier (URI), a uniform resource locator (URL) and/or some other such links or locators. In some embodiments, the URI may be provided by one or more systems and may be based on location of the requesting computer system entity, location of the requested resource, type of the requesting computer system entity, type of the requested resource, access permissions associated with the requesting computer system entity, access permissions associated with the requested resource or other such basis factors. In some embodiments, the content 108 may include instructions, executable code, scripts, applications, programs, processes and/or other such objects that may provide access to other local and/or remote resources on the computer system. In some embodiments, the content 108 may include combinations of links, executable objects or combinations of links, executable objects and/or other such objects that may provide access to other local and/or remote resources on the computer system. In some embodiments, the content 108 may include one or more folders containing links, executable objects or combinations of these and/or other such folders, instructions, executable instructions, or combinations of these and/or other such objects that may provide access to other local and/or remote resources on the computer system.

As mentioned herein, in some embodiments, the content 108 may include resource links such as a URI that may provide access 112 via a computing resource service 114 to an endpoint 118 containing the requested content or resource 116. A computing resource service as described below is a service which may, in some embodiments, be running on a computing resource service provider and which may be configured to at least provide access to computer system resources by one or more computer system services to one or more computer system resources. The endpoint 118 may be local, remote or a combination of local and/or remote and may be configured to provide content and/or other such types of data to computer system entities. In some embodiments, the endpoint may be a directory service, or a web service, or some such other service. In some embodiments, a computing resource service may be configured to, for example, manage directory services for an endpoint such as an enterprise directory. An enterprise directory is a directory which may contain a database of user access objects, policy objects, store objects, applications link objects, security objects and/or other such objects. An enterprise directory database may also include relationships between those database objects, so that the enterprise directory may be able to manage, for example, which users may have access to which stores. In some embodiments, an endpoint may include and/or provide one or more application programming interface (API) calls contained in one or more libraries that may be called by client applications, programs, services, processes and/or other such computer system entities to at least allow configuration, alteration, management and/or other such operations on the endpoint.

Figure 2:
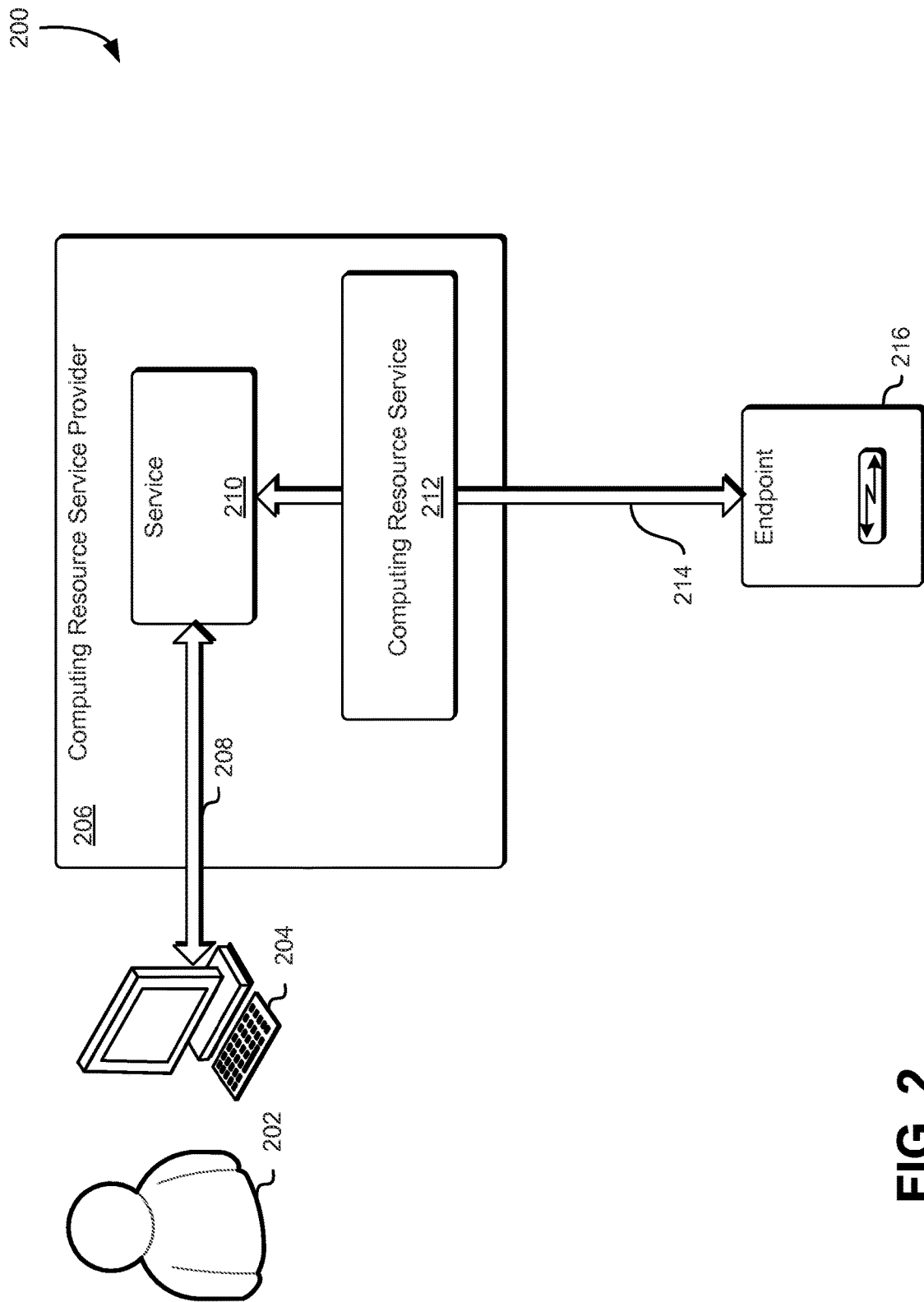
FIG. 2 illustrates an example environment where computer system resources may be accessed in distributed computer system environments via a computing resource service in accordance with at least one embodiment.

FIG. 2 illustrates an environment 200 for accessing computer system resources such as directory services, web services and/or other such services and for accessing resources associated with such services including, but not limited to, user resources, policy resources, network resources and/or storage resources, on distributed and/or virtualized computer system environments as well as the associated code running thereon in accordance with at least one embodiment. A computer system entity, user or process 202 may connect to a computer system through a computer system client device 204 and may request access via connection 208 to one or more computer system services 210. The service or services may be running on a computing resource service provider 206 such as the computing resource service provider described herein at least in connection with FIG. 1 and in accordance with at least one embodiment.

The one or more services 210 of the computing resource service provider 206 may, in some embodiments, require access to one or more system resources and/or endpoints 216 including, but not limited to, directory services, web services and/or other such services and may also require access to resources associated with such system resources such as user resources, policy resources, network resources and/or storage resources associated with the resources and/or services. In some embodiments, where the system resource or resources may be located within the computing resource service provider, the computer services resources provider may provide direct access to the one or more system resources. In some embodiments, where the system resource or resources may be located at least in part outside of the computing resource service provider such as, for example, at least in part on the customer premises, the computer services resources provider may request access to the one or more resources via one or more 214 links or locators such as, for example, by a URI or some other such link. The link may be managed by a service running on the computing resource service provider such as a computing resource service 212 which may be configured to at least provide access to computer system resources to one or more computer system services via one or more links or locators. The link may be provided by a process running within computing resource service provider, or by a process running within the customer premises, or by a process running on a computer system connected to the computing resource service provider, or by a process running on a computer system connected to the customer premises, or by the computing resource service or by a combination of these and/or other such computer system entities. In some embodiments, the process or processes that provide and/or manage the links and/or locators for the computing resource service as well as other processes associated with and/or under the control of the computing resource service may run on computer system entities and/or may use computer system resources within the computing resource service provider, or on the customer premises or on a combination of these and/or other such local and/or remote locations from the computing resource service provider.

Figure 3:
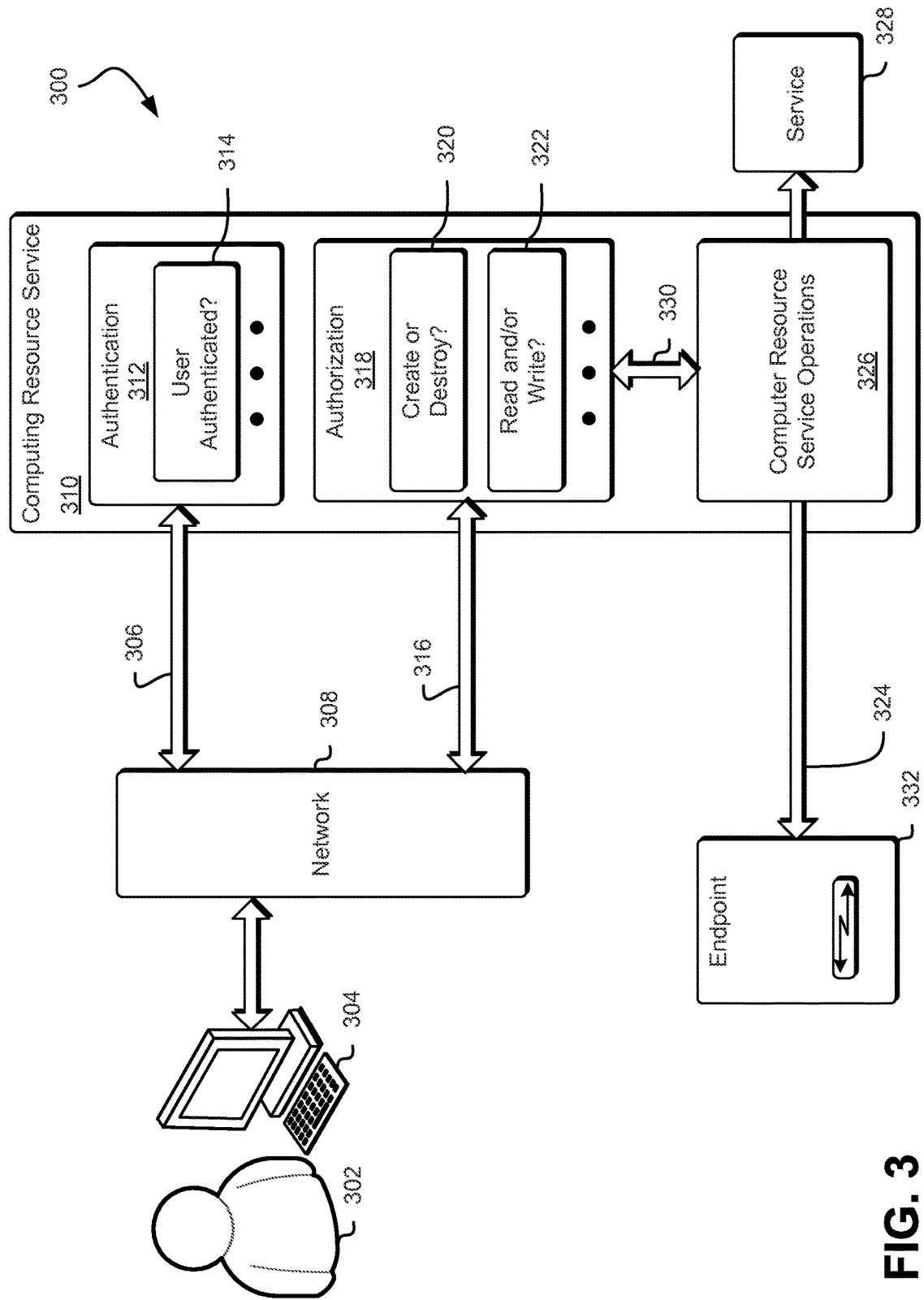
FIG. 3 illustrates an example environment where user requests for authentication, authorization and access by services to system resources may be provided in accordance with at least one embodiment.

FIG. 3 illustrates an environment 300 for servicing user requests for authentication, authorization and access by remote services to local and/or remote computer system resources on distributed and/or virtualized computer system environments in accordance with at least one embodiment. A computer system entity, user or process 302 may connect to a computer system through a computer system client device 304 and may 306 request authentication of credentials in order to facilitate access by the computer system entity, user or process to one or more remote services including, but not limited to, managed directory services, cloud services, web services, virtual machine services, database services and/or other such computing resource service provider services. Access may include the ability to create the directory, delete the directory, extend the directory, connect to the directory, join the directory and/or other such directory management operations. In some embodiments, the command or commands to request authentication of credentials may originate from an outside computer system and/or server, or may originate from an entity, user or process on a remote network location, or may originate from the computer system, or may originate from a user of the computer system client device, or may originate as a result of a combination of these and/or other such objects. The command or commands to request authentication of credentials may, in some embodiments, be issued by a privileged user, or by an unprivileged user, or by an autonomous process, or as a result of an alarm or condition or by a combination of these and/or other methods.

The computer system client device 304 may be connected to the computer system using one or more networks 308 and/or entities associated therewith, such as other servers connected to the network, either directly or indirectly. The computer system client device may include any device that is capable of connecting with the computer system via a network, including at least servers, laptops, mobile devices such as smartphones or tablets, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like.

In some embodiments, the computer system client device 304 may access one or more authentication processes 312 running on and/or under the control of a computing resource service 310 wherein the authentication processes may be configured to at least respond to requests from external processes and to authenticate the credentials of requesting computer system entities, users or processes. For example, the authentication processes may validate 314 whether a requesting computer system entity, user or process is allowed to access the computing resource service. The authentication process may validate access to the computing resource service by verifying a user name and password combination, or by verifying a cryptographic key stored on a hardware, software, firmware or other such device, or by verifying whether the computer system client device is authorized to request access, or by verifying whether the network is authorized to request access or by a combination of these and/or other such verification methods. The authentication process may perform other such authentication tasks and may, in some embodiments, perform authentication tasks in combination with other processes running on and/or with data stored on the computer system and/or on other computer systems.

In some embodiments, a computer system entity, user or process 302 as described herein may connect to a computer system through a computer system client device 304 as described herein, using one or more networks 308 and/or entities associated therewith as described herein, and may 316 request authorization to perform one or more operations and/or processes on one or more computer system resources 332 which may be located, for example, at least in part in a datacenter such as the datacenter described herein at least in connection with FIG. 2 and in accordance with at least one embodiment. In some embodiments, the requested operation authorization may be a requested authorization to directly perform one or more computer system resource operations. In some embodiments, the requested operation authorization may be a requested operation to indirectly perform one or more computer system resource operations. For example, the requested operation authorization may be a request for authorization for a remote computer system service, process or entity under the control of the computer system entity, user or process 302 for authorization to perform one or more computer system resource operations. The authorization may be requested from one or more authorization processes 318 running on and/or under the control of a computing resource service 310 wherein the authorization processes may be configured to at least respond to requests from external processes and to authorize the performance of one or more operations and/or processes by the computer system entity, user or process on one or more computer system resources 332. The computer system resource may be located locally such as in a datacenter on the customer premises, or may be located remotely, or may be located in multiple remote locations such as on a distributed and/or virtual computer system or may be located in a combination of local and/or remote locations. For example, a file system may be located on a local disk located in a local datacenter and the contents of the file system may also be replicated to a one or more remote disks located in one or more remote datacenters. In some embodiments, a file system may have at least a part of its contents located in one datacenter that may be local or remote, and other parts of its contents located in one or more other datacenters.

Examples of operations and/or processes that may be authorized include, but are not limited to, 320 creating and/or destroying resource objects, 322 reading and/or writing resource objects and/or other such system resource operations. Authorization may vary by entity, user or process, by time of the day, by class of entity, by class of user, by class of process, by one or more system policies, by the nature of the request or by a combination of these and/or other such considerations. For example, a computer system entity may be authorized to create files and/or directories but may not be authorized to delete them, or a process may be authorized only to delete files and/or directories that were created by that process and no others, or an entity may be authorized to read certain files in certain directories, but not others. As may be contemplated, these are illustrative examples. Other types of operations may be authorized by the computing resource service authorization system and such other types of operations are also considered as being within the scope of the present disclosure.

In some embodiments, a computer system entity, user or process 302 as described herein may connect to a computer system through a computer system client device 304 as described herein, using one or more networks 308 and/or entities associated therewith as described herein, and may 324 create and/or instantiate one or more remote services 328 that may request access to one or more file systems 332. In some embodiments, the computer service, process or entity 328 may access one or more computing resource service operations processes 326 running on and/or under the control of a computing resource service 310 wherein the computing resource service operations processes may be configured to at least respond to requests from external processes and to provide access to one or more file systems. Access to one or more file systems may include access to operations such as operations to read, write, execute, delete, create, instantiate and/or other such operations, on files and/or other file system objects such as directories, applications, data, databases, links to other file systems, system drivers, computer operating systems, virtual machines and/or other such file system objects. In some embodiments, access to operations may be facilitated by communication 330 with one or more authorization processes 318 as described herein, providing authorization according to resource authorization policies contained therein.

Figure 4:
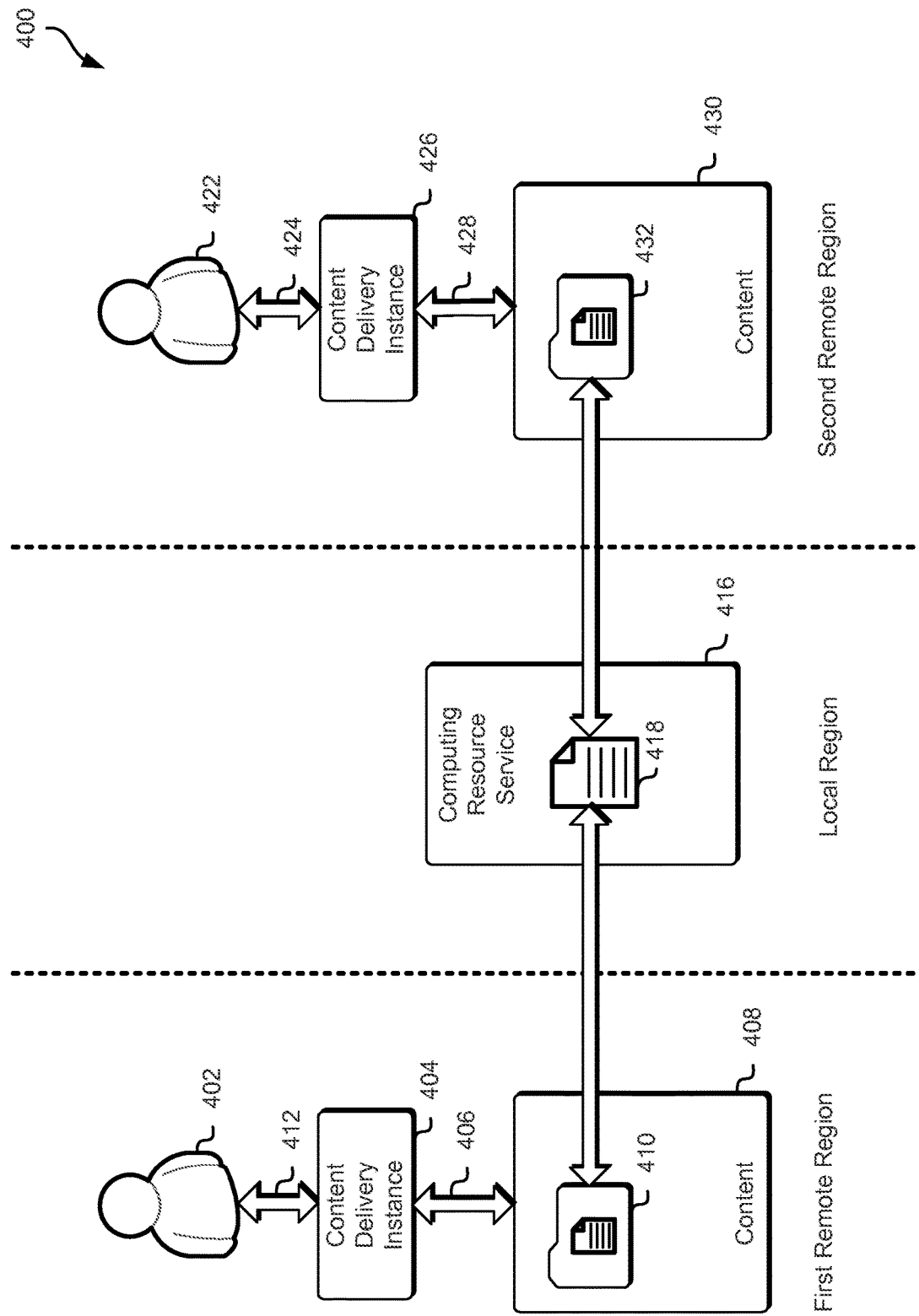
FIG. 4 illustrates an example environment where content on local and/or remote computer system resources may be accessed by computer system entities in accordance with at least one embodiment.

FIG. 4 illustrates an environment 400 for accessing content on local and/or remote computer system resources by one or more local and/or remote users, services, processes and/or other such computer system entities as described herein at least in connection with FIG. 1 and in accordance with at least one embodiment. A user, service, process or other such computer system entity 402 may 412 access a 404 content delivery instance. In some embodiments, the content delivery service 404 may be used to provide 406 access to content 408 as described herein at least in connection with FIG. 1 and accordance with at least one embodiment. The user, service, process or other such computer system entity 402 may be accessing the computing service resource provider using a computer system client device that may be located remotely from the desired content. In some embodiments, the content desired may have been created in and/or may be located in a local computer system region while the computer system user, service, process or other such computer system entity may be located in a different computer system region. For example, the 402 computer system user, service, process or other such computer system entity may desire access to content 418 located in one computer system region. The content desired may be, for example, a web page such as a login page, or an administrative web page such as a console page, or some other such content. Access to such content from a remote location may be provided by a link or locator such as a URI 410 provided by a content delivery service that is local to the computer system user, service, process or other such computer system region.

The content 418 may be provided by a computing resource service as described herein at least in connection with FIG. 2 and in accordance with at least one embodiment. The content may also be provided by a computer system content provider service as described herein at least in connection with FIG. 1 and in accordance with at least one embodiment. Just as the content may be provided to a user, service, process or other such computer system entity 402 in one computer system region, the content may also be provided to another 422 user, service, process or other such computer system entity. A user, service, process or other such computer system entity 422 in a different region may 424 access a 426 content delivery instance which may be used to provide 428 access to content 430 as described herein at least in connection with FIG. 1 and accordance with at least one embodiment. The 422 computer system user, service, process or other such computer system entity may desire access to content 418 located in one computer system region. As described herein, the content desired may be, for example, a web page such as a login page, or an administrative web page such as a console page, or some other such content. Access to such content from a remote location may be provided by a link or locator such as a URI 432 provided by a content delivery service that is local to the computer system user, service, process or other such computer system region.

Figure 5:
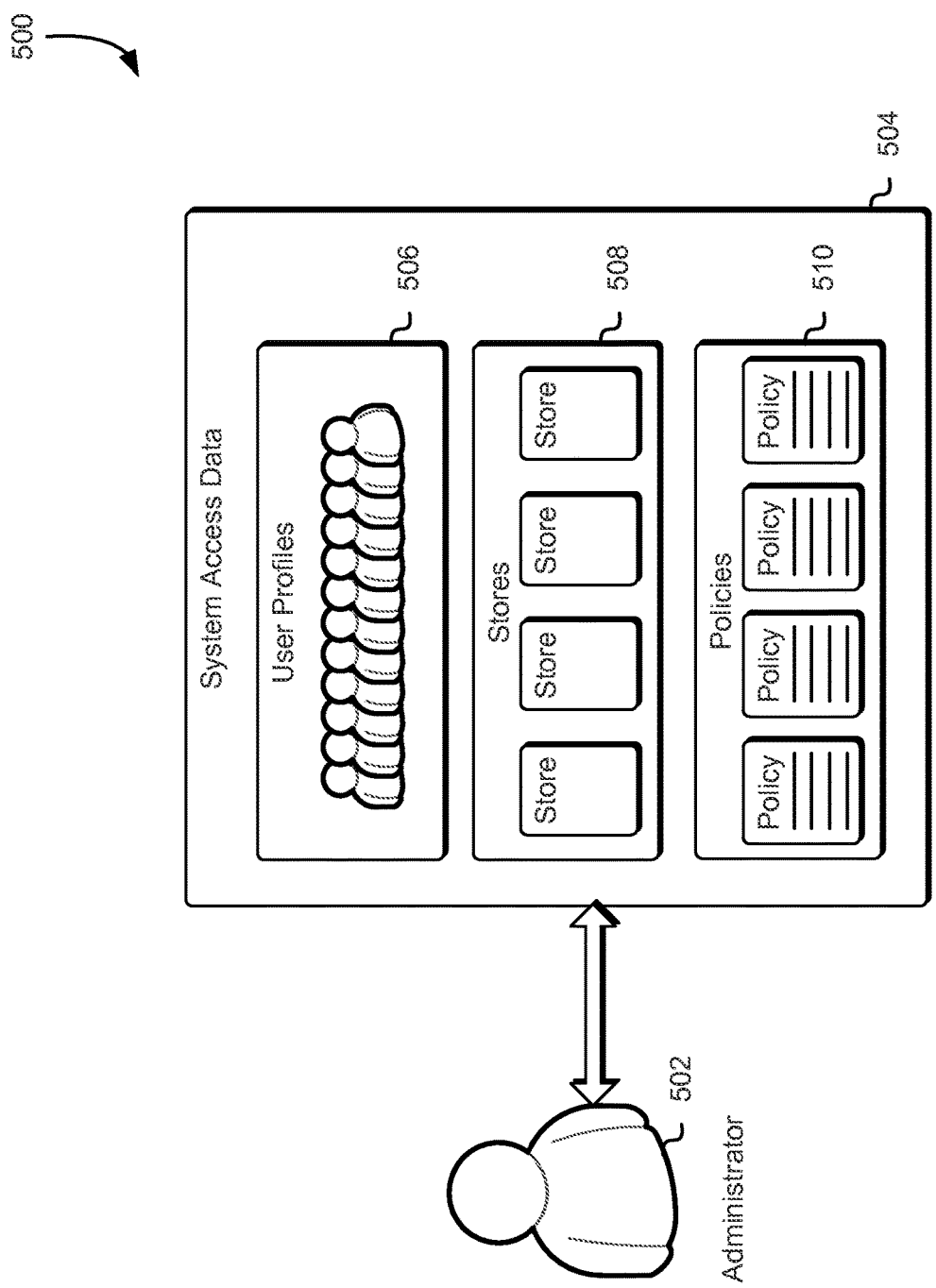
FIG. 5 illustrates an example environment where a central location of user profiles, stores and system policies used for authentication and authorization may be maintained in accordance with at least one embodiment.

FIG. 5 illustrates an example environment 500 for maintaining central location user profiles, stores and system policies used for authentication and authorization credentials as described herein in accordance with at least one embodiment. An administrator 502 may have a set of system access data 504 which may, in some embodiments, be located in one or more local storage locations that may be located on the customer premises, or may, in some embodiments, be located in one or more remote storage locations that may be located in a computing resource service provider or may, in some embodiments, be located in a storage location that may be located in a combination of local and remote storage locations. In some embodiments, the system access data may contain one or more user profiles 506 which may contain user names, user passwords, user biographical data and/or other such user profile information. User profiles may be used by one or more systems to provide authentication services such as the authentication services described herein in accordance with at least one embodiment. In some embodiments, the system access data may contain one or more stores 508 which may contain references to one or more computer system resources. In some embodiments, the system access data may contain one or more polices 510 which may contain one or more policy statements allowing, disallowing and/or limiting access to system resources such as, for example, system services, file systems, directories, machines, virtual machines, applications, documents and/or other such system resources. The policy statements may allow, disallow and/or limit access to system resources based on such factors as the contents of one or more user profiles, the user profile type, the requesting service, the requesting service type, the requesting service location, the time of day, the business value of the user, client, customer, request and/or other such business values or a combination of these and/or other such factors.

Figure 6:
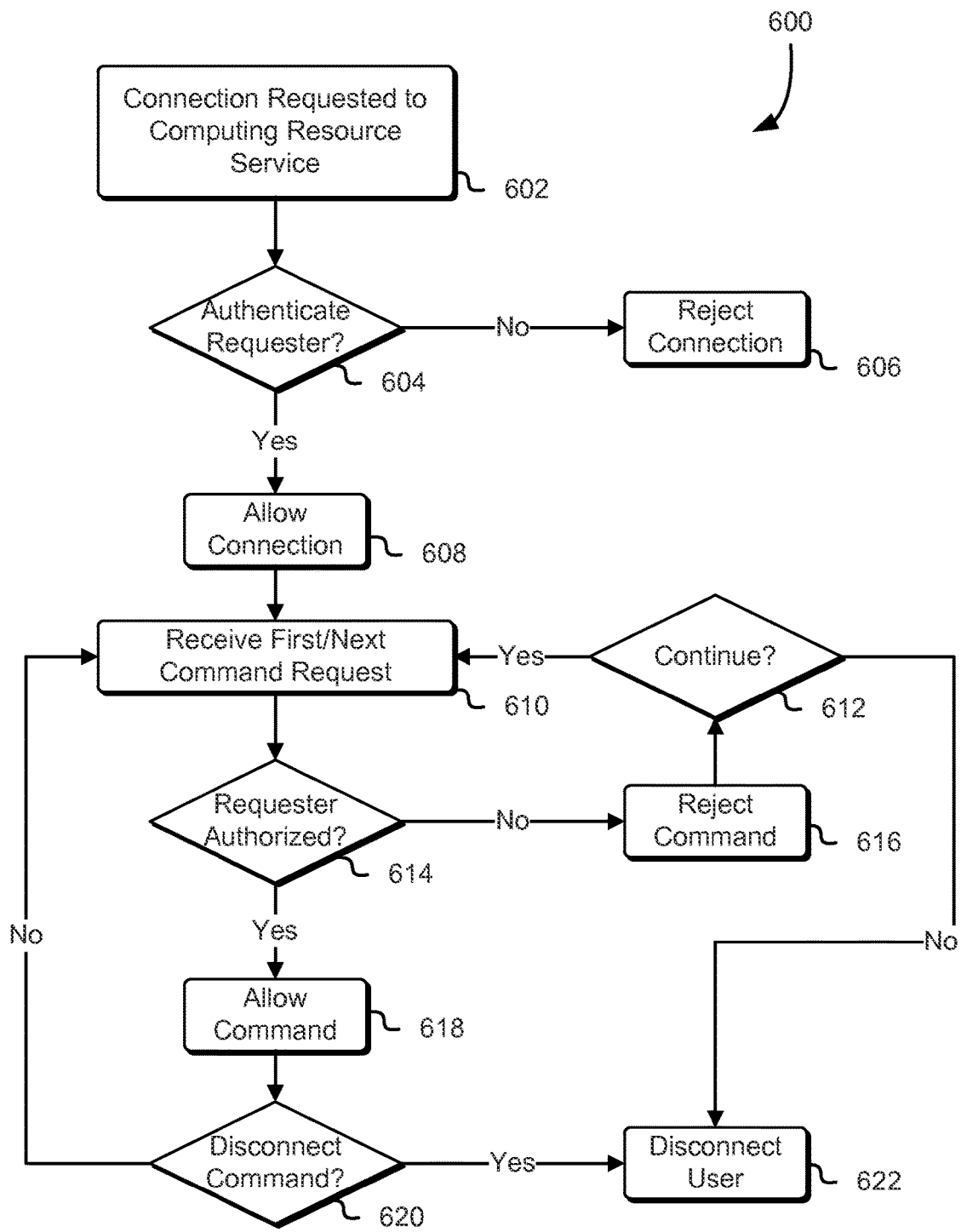
FIG. 6 illustrates an example process for authenticating access to a computing resource service and for authorizing operations on computer system resources associated with the computing resource service in accordance with at least one embodiment.

A managed directory service may provide varying levels of access to different users associated with an account of a computing resource service provider that provides the managed directory service. For example, some users may be able to create and delete directories while other users may lack authorization to delete directories. FIG. 6, accordingly, illustrates an example process 600 for controlling access to management functions of a directory managed by a managed directory service. As discussed in more detail below, the process may be used for authenticating access to a computing resource service and for authorizing an entity that is authenticated to perform one or more commands associated with the computing resource service, as described herein at least in connection with FIG. 1, and in accordance with at least one embodiment. A service such as the computing resource service 114 as described in FIG. 1, or a process associated with a computing resource service may perform the actions illustrated in FIG. 6.

A computing resource service may receive a request 602 to allow the requester to access the computing resource service and one or more of the commands, resources and/or services provided by the computing resource service. In some embodiments, the requester may be a computer system entity, user or process such as the computer system entity, user or process described herein at least in connection with FIG. 1 and in accordance with at least one embodiment. In some embodiments, the request may originate from an outside computer system and/or server, or may originate from an entity, user or process on a remote network location, or may originate from a local computer system, or may originate from a user of a computer system client device, or may originate as a result of a combination of these and/or other such conditions. The command or commands to issue the request may, in some embodiments, be issued by a privileged user, or by an unprivileged user, or by an autonomous process, or as a result of an alarm or condition or by a combination of these and/or other methods.

The computing resource service may first 604 authenticate the user using processes such as the processes described herein at least in connection with FIG. 1 and in accordance with at least one embodiment. The computing resource service may, in some embodiments, use system access data such as the user profile data described herein at least in connection with FIG. 5 and in accordance with at least one embodiment. If the requester is 604 authenticated, the computing resource service may 608 allow the connection and 610 begin receiving commands from the requester. If the requester is 604 not authenticated, the computing resource service may 606 reject the connection.

Once the computing resource service 610 begins receiving commands from the requester, the computing resource service may 614 determine whether the requester is authorized to perform each command. The computing resource service may authorize the requester to perform each command using authorization processes such as the authorization processes described herein at least in connection with FIG. 1 and in accordance with at least one embodiment. The computing resource service may, in some embodiments, use system access data such as the user profile and/or policy data described herein at least in connection with FIG. 6 and in accordance with at least one embodiment.

If the requester is 614 not authorized to perform the received command, the computing resource service may 616 reject the particular command and may then determine whether it should 612 continue processing commands from the requester. In some embodiments, some rejected commands may result in not performing the command, some rejected commands may result in alerting the requester and/or other computer system entities that the command has been rejected, some rejected commands may result in terminating the connection to the requester and some rejected commands may result in a combination of these and/or other such actions. If the computing resource service does elect to 612 continue receiving commands from the requester, the computing resource service may 610 wait for the next command. If the computing resource service does not elect to 612 continue, the computing resource service may 622 disconnect the requester. In some embodiments, 622 disconnecting the requester may include disconnecting the requester, notifying the requester of the disconnection, notifying one or more other computer system entities of the disconnection or a combination of these and/or other such disconnection actions.

If the requester is 614 authorized to perform the received command, the computing resource service may 618 allow the command to be fulfilled, which may include performing the command, alerting the requester that the command is allowed, alerting one or more other system entities that the command is allowed, requesting one or more other system entities to perform the command or a combination of these and/or other such responses. The received command and/or a response to the 618 allow command may include at least in part a 620 request to disconnect which may cause the computing resource service to 622 disconnect the requester. If the computing resource service does not receive a 620 disconnect command, the computing resource service may 610 wait for the next command.

Figure 7:
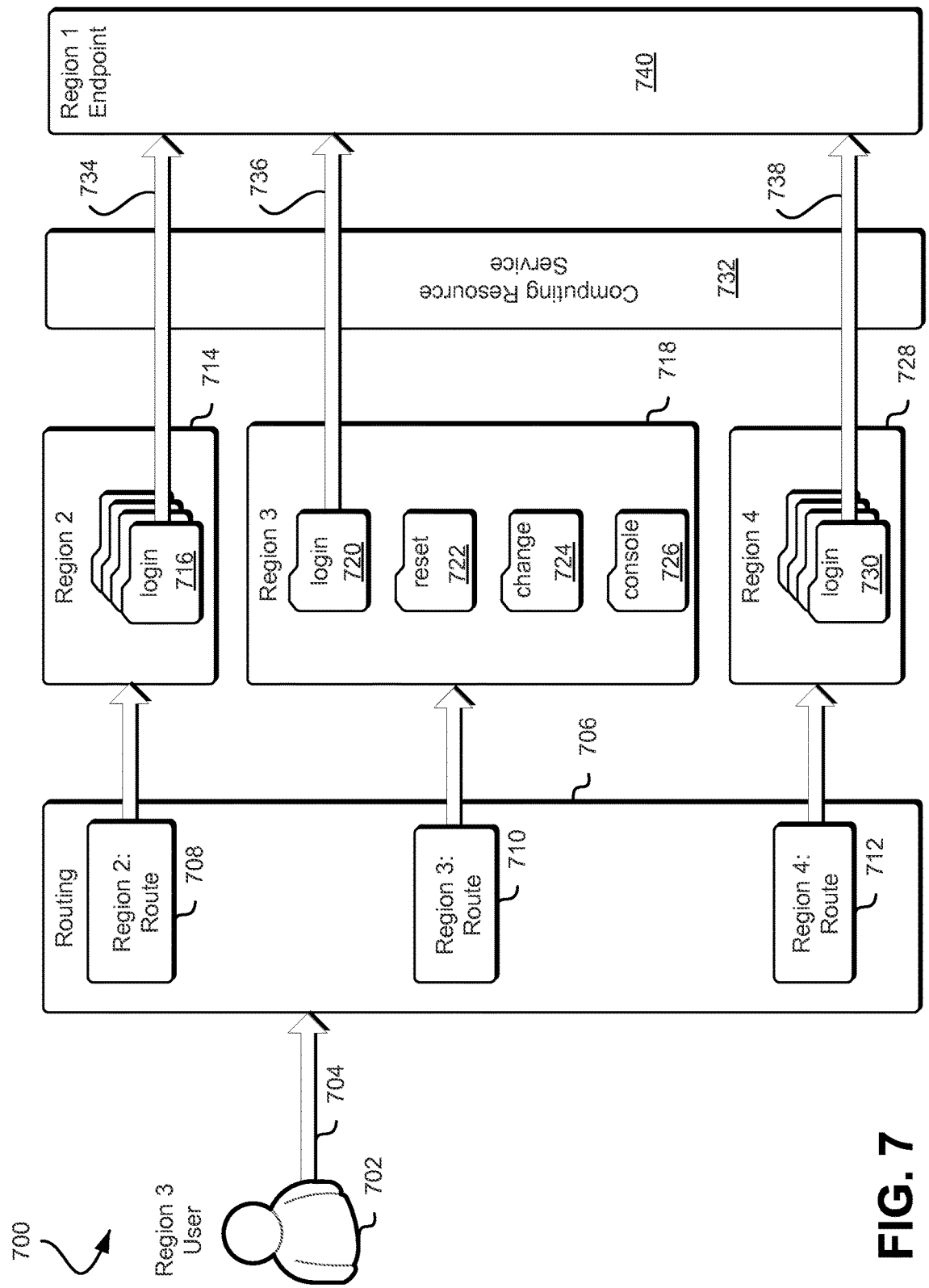
FIG. 7 illustrates an example environment where computer system entities may be provided with a resource locator that may redirect to a computer system resource in accordance with at least one embodiment.

FIG. 7 illustrates an environment 700 for providing computer system entities with a resource locator such as a URI that may redirect the computer system entity from one computer system resource located in one region to another computer system entity located in a different region as described herein at least in connection with FIG. 1 and in accordance with at least one embodiment. A computer system entity 702 such as a computer system user located in, for example, a region referred to herein as region 3 may desire to login to a remote computer system resource such as a 740 endpoint located in a different region such as a region referred to herein as region 1. The endpoint resource 740 may, in some embodiments, have a URI associated with login access to the endpoint resource and, in some embodiments, the URI may be local to the region where the endpoint resource exists and/or was created. The URI may also be based on one or more factors associated with the endpoint resource such as a unique identifier, the creation date, the creation time, the creation location and/or other such naming factors. In some embodiments, a large number of such endpoint resources may exist and the globally unique URI names may be complex and difficult for users to read, use, and/or remember. In such embodiments, aliases for such complex and/or non-human readable URI names may be provided by one or more routing services.

A user 702 may, for example, desire to login to a resource such as a computer system endpoint resource 740 using a provided alias 704 for the URI. The alias may first be examined by a computer system routing instance 706 which, based at least in part on the region of the user and on the contents of the URI alias, determine the proper routing for the login request. For example, the computer system routing instance may determine that the URI alias comes from a region referred to herein as region 2 and may 708 route the login URI request to a global computer service content provider instance 714 that may be dedicated to providing services for requests that originate in region 2. The computer system routing may also determine that the URI alias comes from a region referred to herein as region 3 and may 710 route the login URI request to a global computer service content provider instance 718 that may be dedicated to providing services for requests that originate in region 3. The computer system routing may also determine that the URI alias comes from a region referred to herein as region 4 and may 712 route the login URI request to a global computer service content provider instance 728 that may be dedicated to providing services for requests that originate in region 4. As may be contemplated, these regions and the routing of these aliases are merely illustrative examples and other methods of routing requests to the appropriate regions may be considered as within the scope of the present disclosure.

Once the correct global computer service content provider instance is determined and the login URI request is routed there, the global computer system content provider instance may further determine the proper routing for the URI alias based on the contents and/or nature of the request. For example, a login request from region 2 may use 716 commands, executable code, scripts, redirection and/or other such methods to 734 route the login request to 740 the region 1 endpoint resource as described herein at least in connection with FIG. 1 and in accordance with at least one embodiment. In some embodiments, the commands may be routed to the region 1 endpoint resource using a 736 computing resource service as described herein at least in connection with FIG. 2 and in accordance with at least one embodiment. Similarly, a login request from region 4 may use 730 commands, executable code, scripts, redirection and/or other such methods to 738 route the login request to 740 the region 1 endpoint resource via the computing resource service as described herein at least in connection with FIG. 1 and in accordance with at least one embodiment.

The login request 704 that originates from region 3 may be routed to the global computer service content provider instance 718 that may be dedicated to providing services for requests that originate in region 3 as described herein and in accordance with at least one embodiment. A login request from region 3 may use 720 commands, executable code, scripts, redirection and/or other such methods to 736 route the login request to 740 the region I endpoint resource. Other commands may use different sets of commands such as, for example, for 722 reset, 724 change or 726 console, but may still, in some embodiments, route the commands to 740 the region 1 endpoint resource via the computing resource service.

Figure 8:
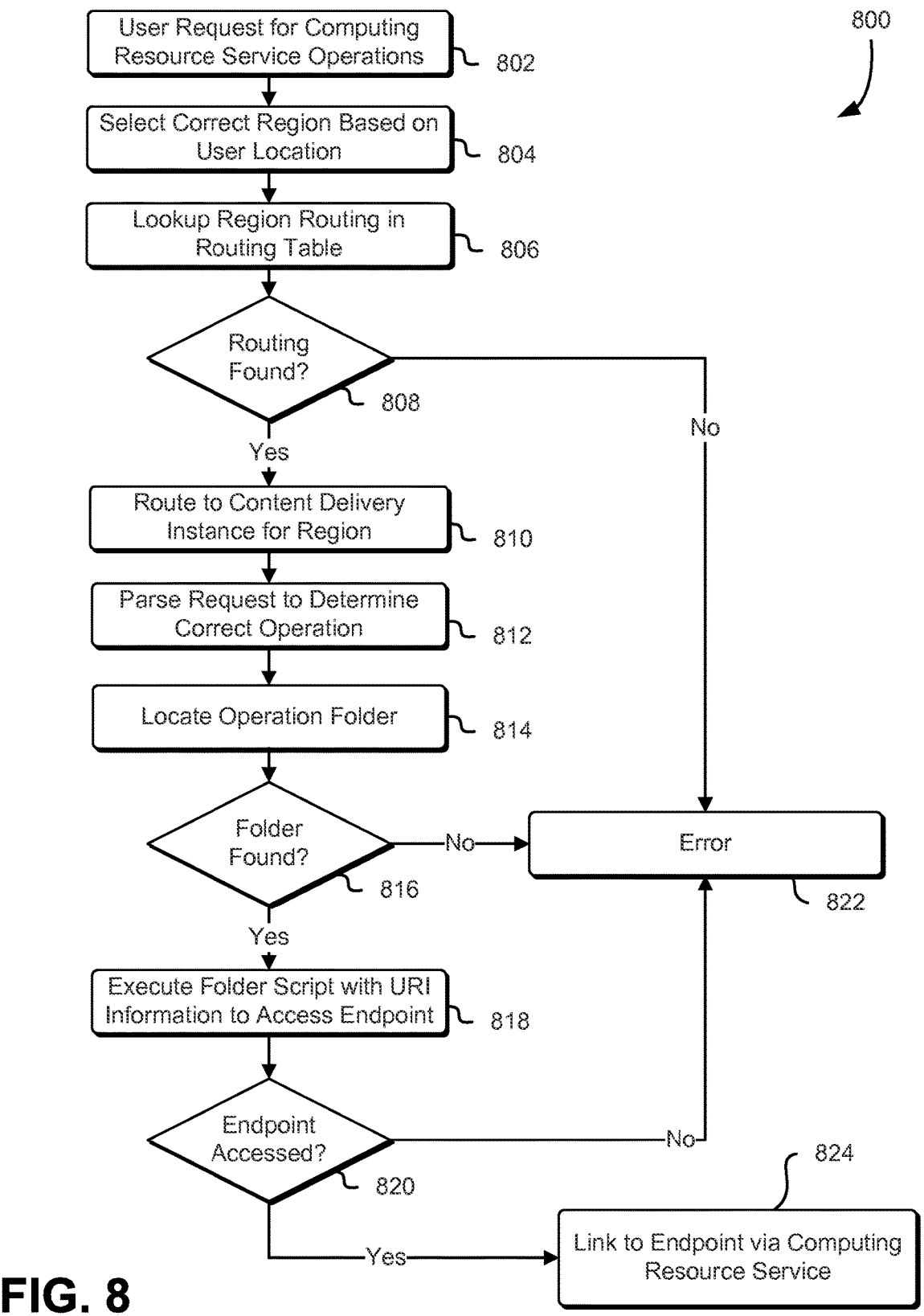
FIG. 8 illustrates an example process for providing access to a resource located in a region different from the region where the request originates in accordance with at least one embodiment.

FIG. 8 illustrates an example process 800 for providing access to an endpoint resource located in one region to a user, process, application, service and/or other such computer system entity located in another region using a single resource located for all regions as described herein at least in connection with FIG. 7 and in accordance with at least one embodiment. A variety of services including routing services 706, content delivery services 718 and computing resource service 732 as described herein at least in connection with FIG. 7 and/or one or more processes associated with such services may perform the actions illustrated in FIG. 8.

A user, process, application, service and/or other such entity may 802 request access to a computer system resource such as an endpoint as described herein at least in connection with FIG. 1 and in accordance with at least one embodiment. A routing service may receive the request for access and may 804 select the correct region to route the request to, based at least in part on the location of the user. The routing service may then 806 check one or more routing tables to determine the proper address to route the request to. If the routing service is 808 not able to determine the proper address to route the request to, the routing service may 822 return an error to the user.

If the routing service is 808 able to determine the proper address to route the request to, the routing service may 810 route the request to the proper address which may, in some embodiments, be received by a content delivery service instance for further processing. In some embodiments, each region may have one or more content delivery services that may provide one or more content delivery service instances to receive the routed request from the routing service. In some embodiments, the content delivery service may be statically configured to receive the requests for at least one region and to deliver the content for that region. In some embodiments, the content delivery service and/or the content delivery regions may be globally accessible to the routing service.

The content delivery service instance may then 812 parse the received request to determine what command may be requested by the user. In some embodiments, a static set of commands that correspond to permitted operations on the endpoint may be provided to the user. For example, a user may be able to request commands including, but not limited to, logging in, resetting, accessing a console and/or other such commands. The content delivery service instance may then 814 attempt to locate the operation folder based on the requested command. In some embodiments, the operation folder may be located in a content location that is local to the endpoint resource. In such embodiments, the content delivery service instance may access the operation folder using one or more computer service capabilities such as networking capabilities as described herein. If the content delivery service instance is 816 not able to locate the operation folder, the content delivery service instance may 822 return an error to the user. In some embodiments, the content delivery service instance may return the error directly to the user. In some embodiments, the content delivery service instance may return the error to the user via the content delivery service, or via the routing service or via a combination of these and/or other such computer system services.

If the content delivery service instance is 816 able to locate the operation folder, the content delivery service instance may then 818 locate one or more sections of executable code, scripts, commands, processes and/or other such informational resources and execute and/or process those informational resources to access the endpoint. In some embodiments, each command, for each endpoint may correspond to a single operational folder. In such embodiments, the contents of the operational folders may be statically configured such that each endpoint may have one static folder for each command in each region. If the content delivery service is able to 820 access the endpoint via the informational resources, the operation requested by the user and/or any endpoint capabilities requested by the operation may be 824 provided to the user via a combination of the content delivery service instance and a computing resource service as described herein at least in connection with FIGS. 1 and 2 and in accordance with at least one embodiment. If the content delivery service is not able 820 to access the endpoint via the informational resources, the content delivery service may 822 return an error to the user. In some embodiments, the content delivery service instance may return the error directly to the user. In some embodiments, the content delivery service instance may return the error to the user via the content delivery service, or via the routing service or via a combination of these and/or other such computer system services.

Figure 9:
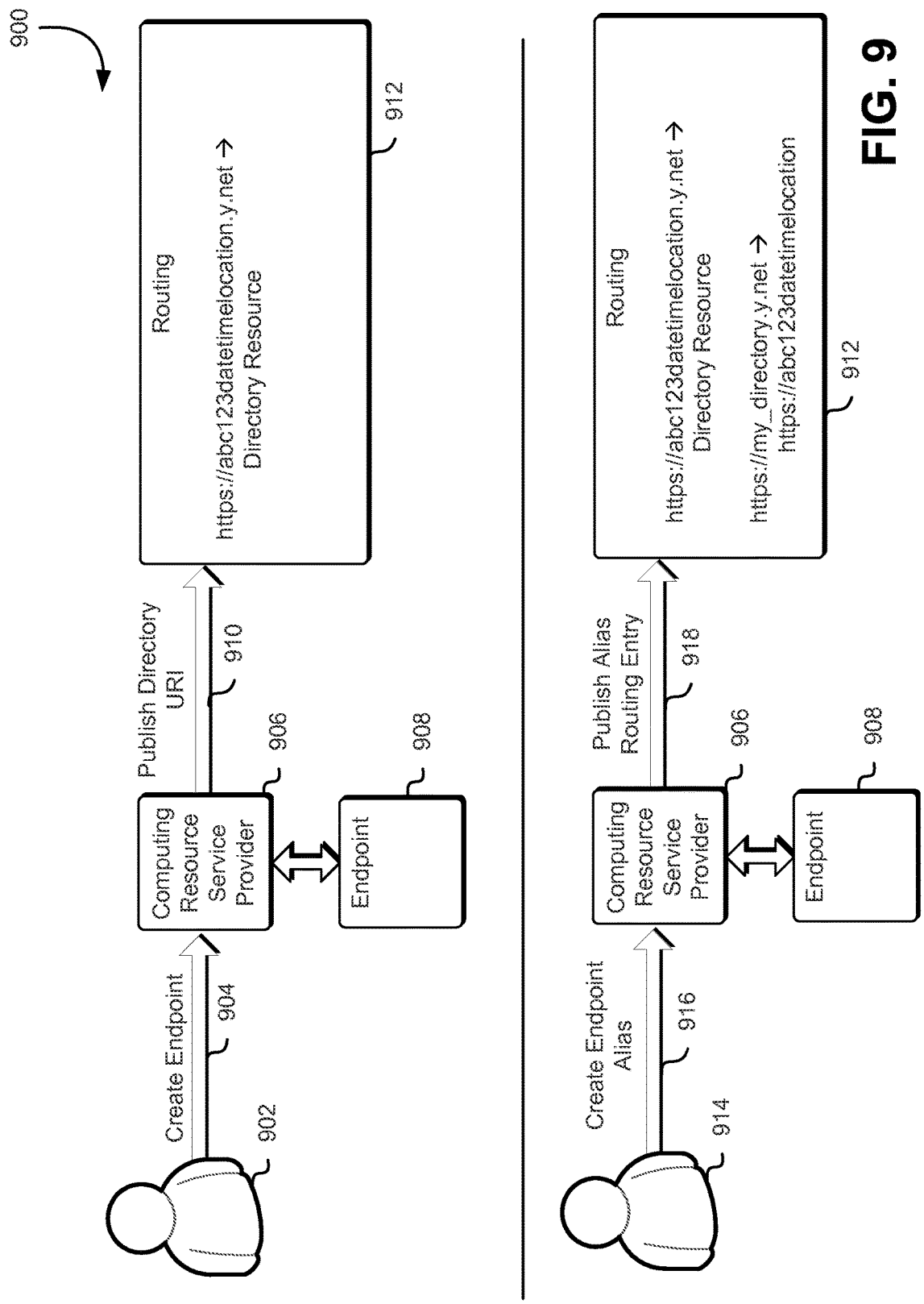
FIG. 9 illustrates an example environment where a uniform resource identifier (URI) that references a system resource may be created, published and aliased in accordance with at least one embodiment.

FIG. 9 describes an environment 900 where a URI that references a computer system resource such as a web service, a directory service and/or some other such computer system endpoint may be created so that the directory service may be accessed by a computing resource service such as a web service manager, a managed directory service and/or other such computer system services, as described herein at least in connection with FIGS. 2 and 7 and in accordance with at least one embodiment. FIG. 9 also illustrates an environment 900 where an alias for a URI that references an endpoint may be created by a user so that the alias to the URI that references the endpoint may be accessed by a computing resource service and/or other such computer system services, as described herein at least in connection with FIGS. 2 and 7 and in accordance with at least one embodiment.

A 902 computer system user, process, application, service and/or other such entity may 904 request the creation of a computer system resource such as a computer system endpoint. In some embodiments, the request to create the computer system resource may be sent to a computing resource service provider 906. The computing resource service provider may create the 908 computer system resource. In some embodiments, as part of creating the resource, the computing resource service provider may create an identifier for the resource and may also create and 910 publish a URI for the resource. The resource identifier and the resource URI may be used by the computer system and by computer services provided by the computing resource service provider to access the resource. In some embodiments, the resource identifier and/or the resource URI may be published to a 912 routing service such as the routing service described herein at least in connection with FIG. 7 and in accordance with at least one embodiment.

A 914 computer system user, process, application, service and/or other such entity may also 916 request the creation of an alias URI for 910 the published computer system resource URI. In some embodiments, the request to create the alias may be sent to the computing resource service provider 906. The alias URI may be 918 published to a 912 routing service such as the routing service described herein at least in connection with FIG. 7 and in accordance with at least one embodiment. The routing service may then provide computer system users, processes, applications, services and/or other such computer system entities with access to the resource using the resource identifier, the resource URI, the resource alias URI and/or other such means of access.

Figure 10:
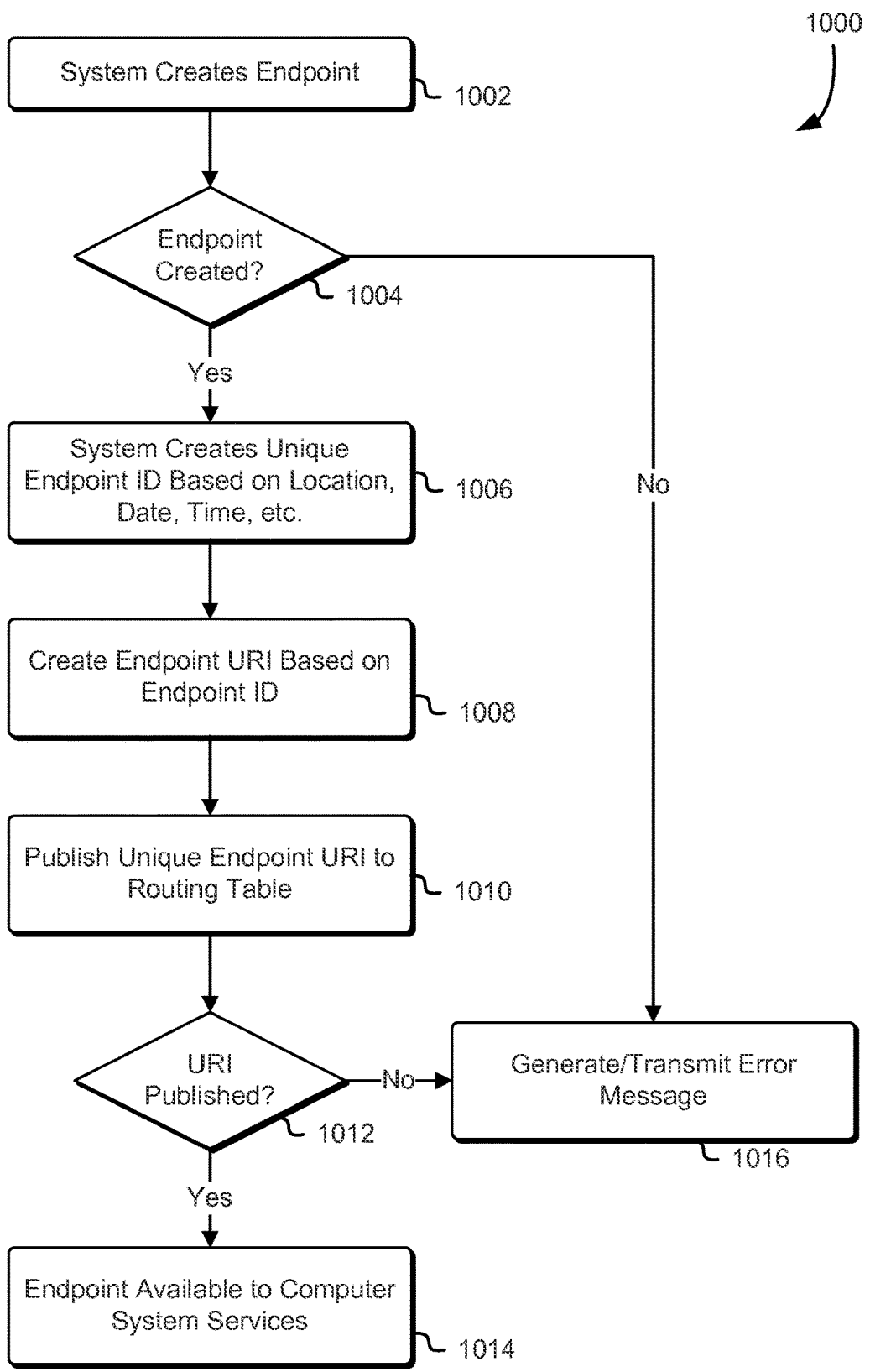
FIG. 10 illustrates an example process for creating and publishing a URI for a computer system resource in accordance with at least one embodiment.

FIG. 10 illustrates an example process 1000 for creating and publishing a URI used for providing access to a directory service resource located in one region to a computer system entity located in another region, using a single resource located for all regions, as described herein at least in connection with FIGS. 7 and 9, and in accordance with at least one embodiment. A variety of services including routing services 706, content delivery services 718 and computing resource service 732 as described herein at least in connection with FIG. 7 and/or one or more processes associated with such services may perform the actions illustrated in FIG. 10.

A request to create an endpoint resource such as a directory service, a web service and/or other such services (referred to herein as a "service") may be generated 1002 by a computer system entity. In some embodiments, the service may include one or more storage locations, one or more access permissions, one or more policies and/or one or more other such service capabilities. In some embodiments, the request to create the service may originate from a user, or a process, or an application, or a service or from some other such computer system entity. If 1004 the service is not successfully created because, for example, the computer system does not have the resources to create the service, then 1016 an error message may be generated and transferred back to the requesting entity using one or more computer system capabilities.

If 1004 the service is successfully created, the system may, in some embodiments, 1006 create a unique identifier for the service. In some embodiments, the identifier may be generated from the date of creation, the time of creation, the region of the creation, the entity that requested creation, one or more globally unique identifiers or a combination of these and/or other factors and/or identifiers. In some embodiments the system may also 1008 create a URI based on the service identifier so that the service may be accessible using a computing resource service as described herein at least in connection with FIG. 2 and in accordance with at least one embodiment.

Once the service identifier and/or the service URI are created, the computer system may then 1010 publish the service identifier and/or the service URI to a routing table such as the routing table described herein at least in connection with FIG. 7 and in accordance with at least one embodiment. If 1012 the service identifier and/or the service URI are not successfully published, the computer system may then 1016 an error message may be generated and the error transferred back to the requesting entity using one or more computer system capabilities. If 1012 the service identifier and/or the service URI are published then 1014 the service may then be made available for other computer system services and/or other such computer system entities.

Figure 11:
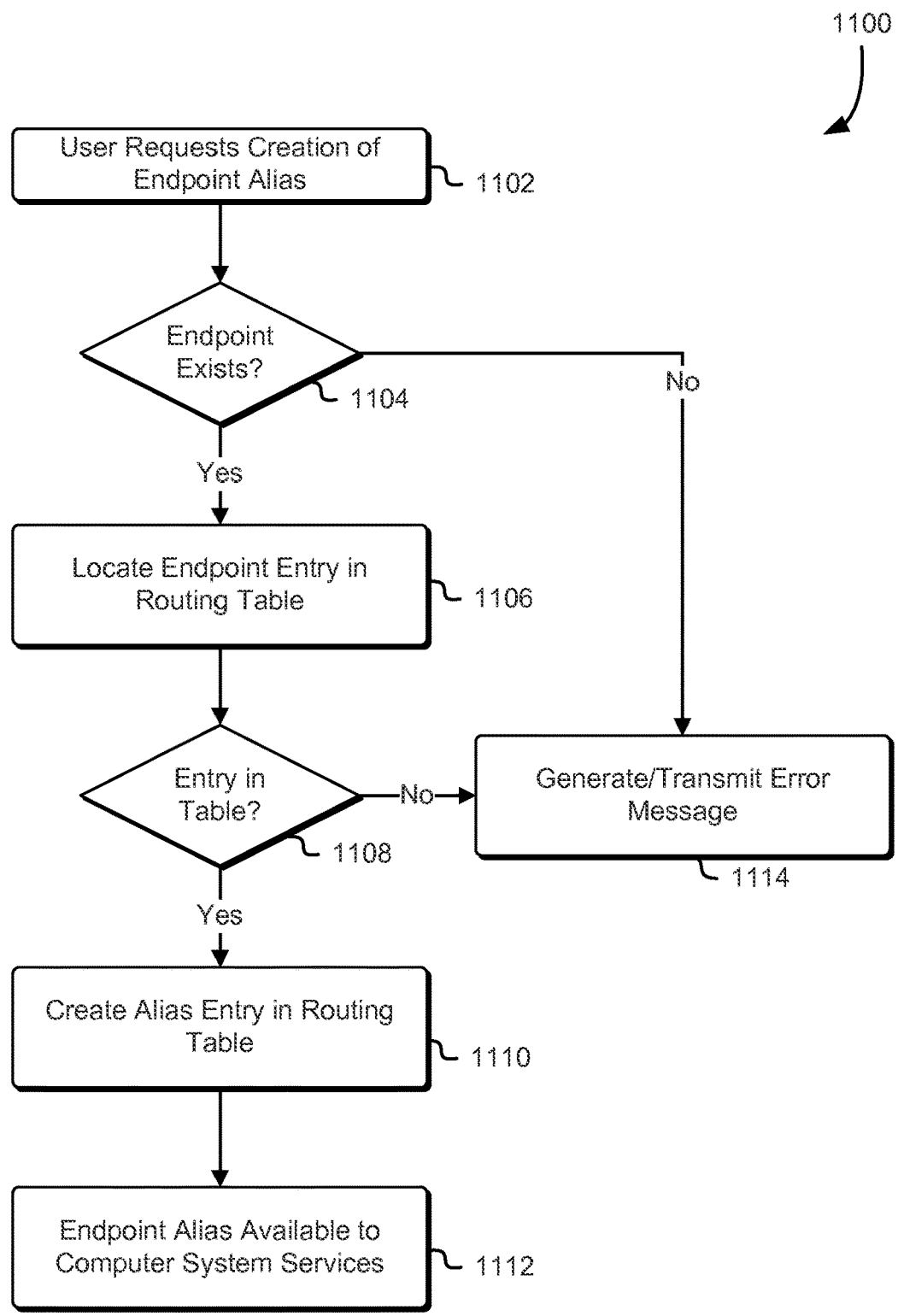
FIG. 11 illustrates an example process for aliasing a published URI in accordance with at least one embodiment.

FIG. 11 illustrates an example process 1100 for creating an alias for a URI used for providing access to an endpoint resource such as a directory service, a web service and/or other such services (referred to herein as a "service") located in one region to a computer system entity located in another region, using a single resource for all regions, as described herein at least in connection with FIGS. 7 and 9, and in accordance with at least one embodiment. A variety of services including routing services 706, content delivery services 718 and computing resource service 732 as described herein at least in connection with FIG. 7 and/or one or more processes associated with such services may perform the actions illustrated in FIG. 11.

A service may be created according to the process illustrated in FIG. 10 with a unique identifier and/or a unique URI based on the unique identifier. As the identifier and/or the URI may be complicated and, in some embodiments, not easily humanly readable, the user may desire to 1102 create a more readable alias for service identifier and/or the service URI. If 1104 the service does not exist, then 1114 an error message may be generated and the error transferred back to the requesting entity using one or more computer system capabilities. If 1104 the service does exist, the computer system may 1106 locate the service identifier and/or the service URI for the service as described herein at least in connection with FIG. 10 and in accordance with at least one embodiment. The service identifier and/or the service URI may be located in a routing table such as the routing table described herein at least in connection with FIG. 7 and in accordance with at least one embodiment. If the computer system is 1108 not able to locate the service identifier and/or the service URI in the routing table, then 1114 an error message may be generated and the error transferred back to the requesting entity using one or more computer system capabilities. If the computer system is 1108 able to locate the service identifier and/or the service URI in the routing table, then the computer system may 1110 create an alias for the service identifier and/or the service URI in the routing table so that a routing service may reroute requests sent to the alias to the correct service identifier and/or the service URI. The service alias 1112 may then be made available for other computer system services and/or other such computer system entities.

Figure 12:
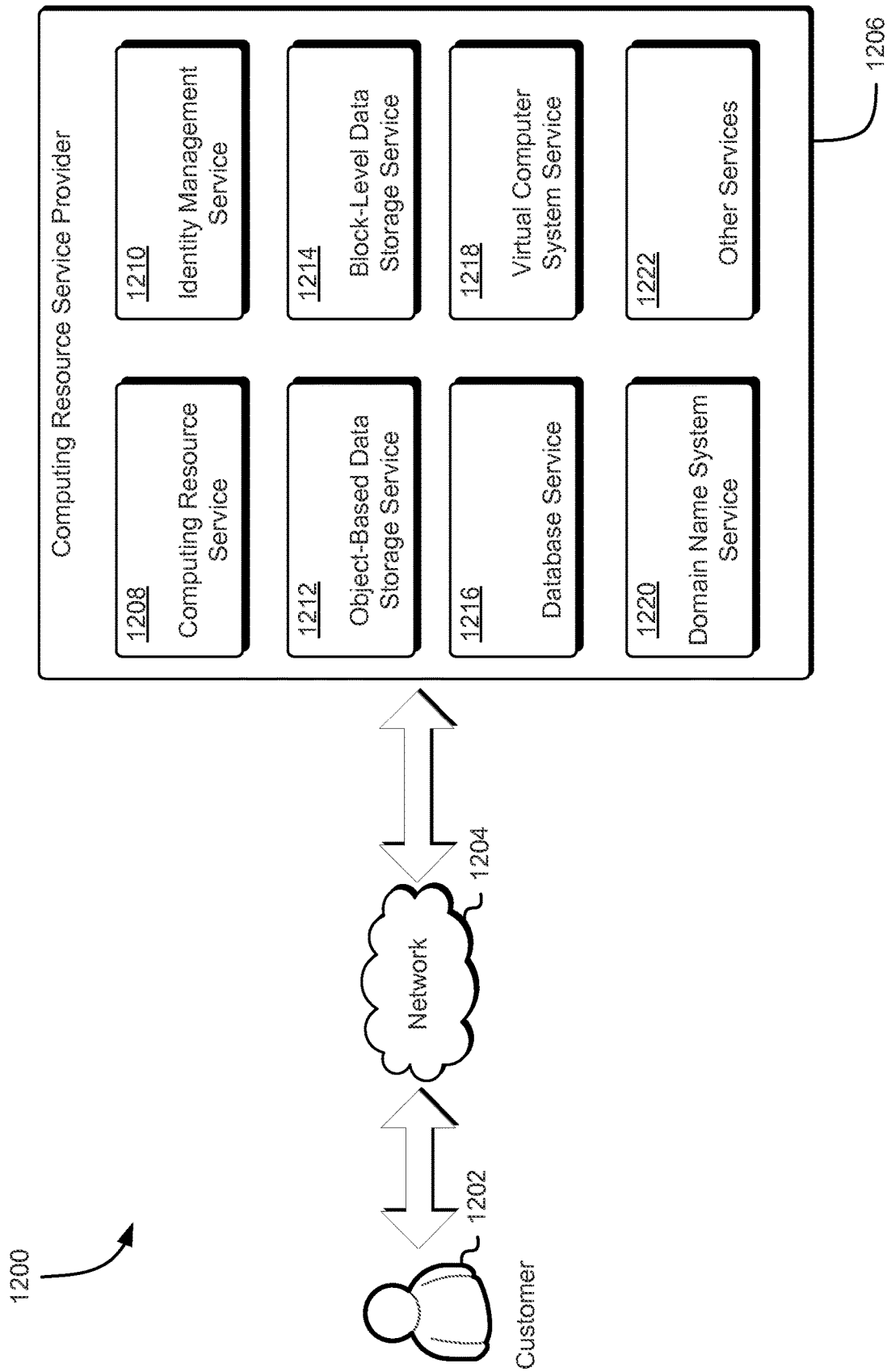
FIG. 12 illustrates an example environment where various services may be provided to access computer system resources in accordance with at least one embodiment.

FIG. 12 shows an illustrated example of an environment 1200 in which various embodiments of the present disclosure may be practiced. In FIG. 12, a computing resource service provider 1206 may provide a variety of services to a customer 1202. One or more of the services may be accessible to the customer 1202 utilizing techniques discussed above. The customer 1202 may be an organization that may utilize the various services provided by the computing resource service provider 1206 to allow a variety of users to access one or more resources within a computing resource service 1208. The customer 1202 may communicate with the computing resource service provider 1206 through one or more communications networks 1204, such as the networks described in the present disclosure. In some embodiments, communications from the customer 1202 to the computing resource service provider 1206 may cause the computing resource service provider 1206 to operate in accordance with various techniques described herein or variations thereof.

As noted above, a computing resource service provider 1206 may provide various computing resource services to its customers. For instance, in this particular illustrative example, the computing resource service provider 1206 provides a number of services. The services provided by the computing resource service provider, in this example, include a computing resource service 1208, an identity management service 1210, an object-based data storage service 1212, a block-level data storage service 1214, a database service 1216, a virtual computer system service 1218, a domain name system service 1220 and one or more other services 1222. In some embodiments, one or more of the illustrated services may be provided by the computing resource service provider in addition to, or as an alternative to, the services explicitly described herein. In some embodiments, additional services may also be provided by the computing resource service provider in addition to, or as an alternative to, the services explicitly described herein.

The computing resource service 1208 may provide a variety of services to enable computer systems and/or computer system client devices to access system resources including, but not limited to, authentication, authorization and other management service operations as described herein at least in connection with FIG. 3 and in accordance with at least one embodiment. For example, the computing resource service 1208 may provide authentication services which may authenticate credentials of a user, computer system, process, automated process or other such entity to at least determine whether that entity is authorized to access the computing resource service 1208 and/or the system resources associated with the computing resource service 1208. In some embodiments, the credentials may be authenticated by the computing resource service 1208 itself, or they may be authenticated by a process, program or service under the control of the computing resource service 1208, or they may be authenticated by a process, program or service that the computing resource service 1208 may communicate with or they may be authenticated by a combination of these and/or other such services or entities.

The computing resource service 1208 may also provide authorization services which may authorize a user, computer system, process, automated process or other such entity to at least determine which actions of one or more possible actions that entity may perform. Examples of actions that an entity may or may not be authorized to perform include, but are not limited to, creating resources, destroying resources, attaching to resources, detaching from resources, providing access links to resources, reclaiming access links to resources, allowing reads from resources, allowing writes to resources and/or other such actions.

The computing resource service 1208 may also provide resource management services which may provide an authenticated entity access to the system resources according to the authorization credentials and/or policies. For example, in an embodiment where a computer system entity may be authorized to read and write a certain data store on a certain directory, the ability to do so may be provided by the resource management services. The resource management services may provide access to customer directories by providing links to the customer directory locations such as by a URI object or some other such linkage. The URI may be provided by the computer system client device, or by a process running at the data center, or by a process running on a computer system connected to the datacenter, or by the computing resource service or by a combination of these and/or other such computer system entities.

The identity management service 1210 may provide a variety of services to enable customers to define a level of access to other services, such as those illustrated in FIG. 12, provided by the computing resource service provider 1206. Accordingly, a customer 1202 may access the identity management service 1210 to create and manage one or more users and groups that may utilize the services provided by the computing resource service provider 1206. A customer 1202 may utilize the identity management service 1210 to define a set of infrastructure policies for each user and/or group to allow and/or deny their permissions to access the services provided by the computing resource service provider 1206.

As noted above, a customer 1202 may utilize a set of credentials to access the computing resource service provider 1206. The identity management service 1210 may be configured to verify the identity of the customer 1202 within the identity management service 1210. Accordingly, the customer 1202 may be able to access the computing resource service 1208 and request one or more identity management services. In some embodiments, the customer 1202 may utilize the identity management service 1210 to identify one or more users of the computing resource service provider 1206 that may be permitted to utilize a new appropriately configured API call provided by the computing resource service 1208 to access computing system resources.

The object-based data storage service 1212 may comprise a collection of computing resources that collectively operate to store data for a customer 1202. The data stored in the object-based data storage service 1212 may be organized into data objects. The data objects may have arbitrary sizes except, perhaps, for certain constraints on size. Thus, the object-based data storage service 1212 may store numerous data objects of varying sizes. The object-based data storage service 1212 may operate as a key value store that associates data objects with identifiers of the data objects which may be used by the customer to retrieve or perform other operations in connection with the data objects stored by the data storage service 1212. Access to the data storage service may be through appropriately configured API calls.

The block-level data storage service 1214 may comprise a collection of computing resources that collectively operate to store data for a customer. For instance, the block-level data storage system may be configured to provide block-level data storage volumes for use with a virtual machine instance. A customer 1202 may interact with the block-level data storage service 1214 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The database service 1216 may be a collection of computing resources that collectively operate to run one or more databases for one or more customers. Customers 1202 of the computing resource service provider 1206 may operate and manage a database from the database service 1216 by utilizing appropriately configured API calls. This, in turn, may allow a customer 1202 to maintain and potentially scale the operations in the database.

The virtual computer system service 1218 may be a collection of computing resources configured to instantiate virtual machine instances onto virtual computing systems on behalf of the customers 1202 of the computing resource service provider 1206. Customers 1202 of the computing resource service provider 1206 may interact with the virtual computer systems service 1218 to provision and operate virtual computer systems that are instantiated on physical computing devices hosted and operated by the computing resource service provider. The virtual computer systems may be used for various purposes, such as to operate as servers supporting a website. Other applications for the virtual computer systems may be to support database applications, electronic commerce applications, business applications and/or other applications.

The Domain Name System (DNS) service 1220 may be designed to give customers 1202 a method to route end users to one or more communications network applications. For instance, the DNS service 1220 may be configured to translate human-readable names, such as a URL or a URI, into numeric Internet Protocol (IP) addresses that computer systems may use to connect to each other over the Internet. Thus, the DNS service 1220 may be configured to connect requests to access one or more services provided by the computing resource service provider 1206 to the infrastructure that is operating within a data zone. The DNS service 1220 may additionally be configured to route customers 1202 of the computing resource service provider 1206 to infrastructure outside of the data zone, such as another computing system operated by a separate provider.

The computing resource service provider 1206 may additionally maintain one or more other services 1222 based on the needs of its customers 1202. For instance, the computing resource service provider 1206 may maintain an account service which may comprise a collection of computing resources that collectively operate to maintain customer account information for each customer 1202 of the computing resource service provider 1206. The account service may include, for example, the customer name, address, phone numbers, billing details and other personal identification information for each customer of the computing resource service provider. Other services include, but are not limited to, load balancing services and services that manage other services and/or other services.

Figure 13:
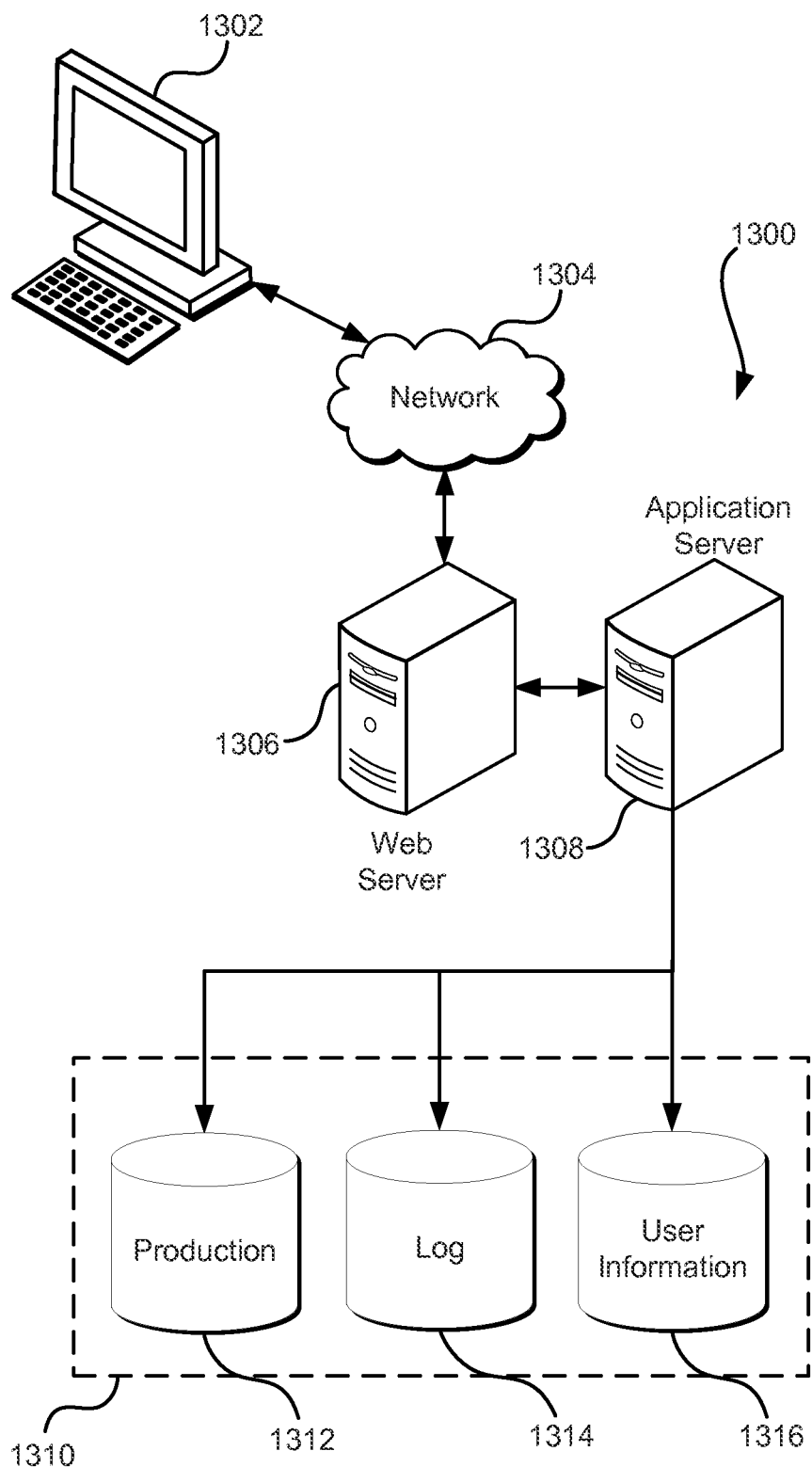
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology. Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C. or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for providing access to a computer system resource, comprising:
    generating a uniform resource identifier corresponding to the computer system resource, the uniform resource identifier based at least in part on a unique identifier of the computer system resource and encoding a command of a plurality of commands in the uniform resource identifier;
    receiving, from a requestor, a request to resolve the uniform resource identifier, wherein the uniform resource identifier corresponds to a service provider network that comprises a plurality of network entry locations each corresponding to a content provider location of a plurality of content provider locations;
    selecting a network entry location, from the plurality of network entry locations, that corresponds to the uniform resource identifier;
    determining, in the content provider location of the network entry location selected, a content location to access from among a plurality of content locations based at least in part on the command encoded in the uniform resource identifier; and
    providing, from the content location determined, executable code whose execution is configured to determine an endpoint for the uniform resource identifier, thereby enabling the requestor to access the endpoint corresponding to the computer system resource.

2. The computer-implemented method of claim 1, wherein the executable code is provided from a data storage location containing a plurality of instances of executable code, each corresponding to an action that may be performed on the computer system resource.

3. The computer-implemented method of claim 1, wherein the executable code provided to the requestor provides access to an endpoint on a web service.

4. The computer-implemented method of claim 1, wherein the executable code provided to the requestor provides access to an endpoint on a directory service.

5. The computer-implemented method of claim 1, wherein the request from the requestor contains an alternate uniform resource identifier that redirects to the uniform resource identifier, wherein selecting the network entry location is based on the alternate uniform resource identifier.

6. The computer-implemented method of claim 1, wherein the executable code is configured such that the executable code is executed by the requestor.

7. The computer-implemented method of claim 1, wherein the executable code is configured such that the executable code is executed by the computer system resource.

8. A system, comprising one or more machine-readable mediums comprising a set of instructions, which if performed by one or more processors, cause the system to at least:

generate a uniform resource identifier to represent a service to be accessible from a plurality of network entry locations, the uniform resource identifier encoding a command and comprising a unique identifier of the service;

receive, from a requestor, a request to resolve the uniform resource identifier, wherein the uniform resource identifier corresponds to a service provider network that comprises a plurality of network entry locations each corresponding to a content provider location of a plurality of content provider locations;

route the request to a network entry location of the plurality of network entry locations, the network entry location selected based at least in part on the uniform resource identifier;

determine a content location to access from among a plurality of content locations based at least in part on the command encoded in the uniform resource identifier; and provide, from the content location determined, executable code whose execution enables the requestor to access the service.

9. The system of claim 8, wherein a content provider instance is configured to use one or more parameters in the uniform resource identifier to route the request to the network entry location.

10. The system of claim 8, wherein the content location is selected from among a plurality of data storage locations in a provider region based at least in part on one or more parameters of the uniform resource identifier.

11. The system of claim 10, wherein the content location selected contains the plurality of content locations.

12. The system of claim 8, wherein a routing instance is configured to determine whether the uniform resource corresponds to an alternate resource identifier, and to route the request to the network entry location based on the alternate resource identifier determined.

13. The system of claim 8, wherein the executable code is one of a plurality of instances of executable code, each corresponding to an operation performed by the service.

14. The system of claim 8, wherein a content provider instance is configured to provide the executable code to the requestor.

15. The system of claim 8, wherein a content provider instance is configured to provide the executable code to a computer system resource.

16. A non-transitory computer-readable storage medium comprising executable instructions that, if executed by one or more processors of a computer system, cause the computer system to at least:

generate a uniform resource identifier to represent a service to be accessible from a plurality of network entry locations;

receive the uniform resource identifier that encodes a command and comprises an identifier of the service, wherein the uniform resource identifier corresponds to a service provider network that comprises a plurality of network entry locations each corresponding to a content provider location of a plurality of content provider locations;

select, from the plurality of network entry locations, a network entry location that corresponds to the uniform resource identifier;

determine a content location to access from among a plurality of content locations based at least in part on the network entry location and the command encoded in the uniform resource identifier; and provide, from the content location determined, executable code whose execution is configured to determine an endpoint for the uniform resource identifier, thereby enabling access to the service.

17. The non-transitory computer-readable storage medium of claim 16, wherein the instructions further comprise instructions that, if executed by the one or more processors, further cause the computer system to use the command encoded in the uniform resource identifier to route a request to the network entry location.

18. The non-transitory computer-readable storage medium of claim 16, wherein the instructions further comprise instructions that, if executed by the one or more processors, further cause the computer system to access a data storage location in a content provider region based on the command of the uniform resource identifier, the data storage location containing the plurality of content locations.

19. The non-transitory computer-readable storage medium of claim 16, wherein a request contains an alternate uniform resource identifier that redirects to the uniform resource identifier that corresponds to a plurality of network entry locations to a service provider network.

20. The non-transitory computer-readable storage medium of claim 16, wherein the executable code is provided as a response to a request.

21. The non-transitory computer-readable storage medium of claim 16, wherein the executable code is one of a plurality of instances of executable code, each corresponding to an operation performed by the service.

22. The non-transitory computer-readable storage medium of claim 16, wherein the executable code is statically configured.

23. The non-transitory computer-readable storage medium of claim 16, wherein the executable code is configured to use the command of the uniform resource identifier to determine the endpoint.

* * * * *